(12) United States Patent
Boehm

(10) Patent No.: US 11,980,303 B2
(45) Date of Patent: *May 14, 2024

(54) ADJUSTABLE VANITY MIRROR WITH HANGER BRACKET AND SUCTION CUP

(71) Applicant: Mirrorglow LLC, Austin, TX (US)

(72) Inventor: Glen Robert Boehm, Austin, TX (US)

(73) Assignee: Mirrorglow LLC, Austin, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 18/072,052

(22) Filed: Nov. 30, 2022

(65) Prior Publication Data

US 2023/0088991 A1 Mar. 23, 2023

Related U.S. Application Data

(63) Continuation of application No. 17/537,303, filed on Nov. 29, 2021, now Pat. No. 11,576,507, which is a
(Continued)

(51) Int. Cl.
*A47G 1/17* (2006.01)
*A47G 1/02* (2006.01)
(Continued)

(52) U.S. Cl.
CPC .............. *A47G 1/17* (2013.01); *A47G 1/02* (2013.01); *G02B 7/198* (2013.01); *A47G 2001/002* (2013.01); *A47G 2200/08* (2013.01)

(58) Field of Classification Search
CPC ...... A47G 1/17; A47G 1/02; A47G 2001/002; A47G 2200/08; A45D 42/10; A45D 42/14; G02B 7/198; F16B 47/00; F16M 11/28
(Continued)

(56) References Cited

U.S. PATENT DOCUMENTS 723,700 A * 3/1903 May
1,006,315 A 10/1911 Toth
(Continued)

FOREIGN PATENT DOCUMENTS

CN 203987192 12/2014
CN 204146740 2/2015

OTHER PUBLICATIONS

Simplehuman Sensor Mirror Trio, https://www.simplehuman.com/sensor-mirrors/round/trio, available at least as of Aug. 10, 2018.
(Continued)

*Primary Examiner* — Ricky D Shafer
(74) *Attorney, Agent, or Firm* — Byrne Poh LLP

(57) ABSTRACT

The invention comprises a hands-free, adjustable telescoping magnifying mirror. The mirror may have a first reflective surface and a second reflective surface and can be secured to a horizontal or vertical surface using a suction cup base or can be hung over a door or ledge using a retractable hanger bracket. A multi-stage telescoping rod is attached to the suction cup base and a swivel joint may be used to connect the telescoping rod to the mirror housing. The mirror may be extended from the base by extending the telescoping rod and the mirror assembly can stand freely without falling over, whether the suction cup base is engaged or not. Additionally, one or more light sources with diffuser screen may be disposed at a periphery of the first reflective surface or second reflective surface.

15 Claims, 39 Drawing Sheets

Related U.S. Application Data continuation-in-part of application No. 16/548,725, filed on Aug. 22, 2019, now Pat. No. 11,209,609.

(60) Provisional application No. 62/722,749, filed on Aug. 24, 2018.

(51) Int. Cl.
*G02B 7/198* (2021.01)
*A47G 1/00* (2006.01)

(58) Field of Classification Search
USPC .................... 359/840, 872, 881; 248/467
See application file for complete search history.

(56) References Cited

U.S. PATENT DOCUMENTS

| | | | |
|---|---|---|---|
| 2,146,859 A | 2/1939 | Seklehner | |
| D159,100 S | 6/1950 | Ryder | |
| 2,578,062 A * | 12/1951 | Greene | G01C 15/10 |
| | | | 33/392 |
| 2,880,651 A | 4/1959 | Fenyo | |
| 2,915,944 A | 12/1959 | Butts | |
| 3,392,950 A | 7/1968 | Pierce | |
| 3,476,927 A | 11/1969 | Rothman | |
| D216,414 S | 12/1969 | Hanson | |
| 3,781,093 A | 12/1973 | Gabijas | |
| 4,067,535 A | 1/1978 | Rose | |
| D298,087 S | 10/1988 | Arce | |
| D298,183 S | 10/1988 | Bruse | |
| 4,856,888 A | 8/1989 | Wahl | |
| D307,678 S | 5/1990 | Lookerse | |
| D309,833 S | 8/1990 | Wahl | |
| 4,950,065 A | 8/1990 | Wyman | |
| D310,584 S | 9/1990 | Cadet | |
| D316,635 S | 5/1991 | Smith | |
| 5,411,230 A | 5/1995 | Messinger | |
| 5,453,915 A | 9/1995 | Bradley, III | |
| 5,784,213 A | 7/1998 | Howard | |
| 6,130,790 A | 10/2000 | Tu | |
| D438,389 S | 3/2001 | Ross | |
| 6,206,530 B1 | 3/2001 | Eberts | |
| D444,634 S | 7/2001 | Dodson | |
| 6,305,809 B1 | 10/2001 | Zadro | |
| 6,398,378 B1 | 6/2002 | Shieh | |
| 6,840,639 B2 | 1/2005 | Zadro | |
| 6,854,852 B1 | 2/2005 | Zadro | |
| D505,555 S | 5/2005 | Snell | |
| D508,883 S | 8/2005 | Falconer | |
| 6,932,374 B1 | 8/2005 | Timms | |
| D512,841 S | 12/2005 | Dirks | |
| 7,048,406 B1 | 5/2006 | Shih | |
| 7,090,378 B1 | 8/2006 | Zadro | |
| D532,981 S | 12/2006 | Zadro | |
| D547,555 S | 7/2007 | Lo | |
| D563,679 S | 3/2008 | Vidmar | |
| 7,341,356 B1 | 3/2008 | Zadro | |
| D574,159 S | 8/2008 | Howard | |
| 7,416,205 B1 | 8/2008 | Sam | |
| 7,562,980 B2 | 7/2009 | Rymniak | |
| 7,635,111 B2 | 12/2009 | Hara et al. | |
| 7,651,229 B1 | 1/2010 | Rimback | |
| 8,162,502 B1 | 4/2012 | Zadro | |
| D670,087 S | 11/2012 | Walker | |
| 8,348,216 B2 | 1/2013 | Hajianpour | |
| 8,356,908 B1 | 1/2013 | Zadro | |
| 8,556,447 B2 | 10/2013 | Griggs | |
| 8,584,997 B2 | 11/2013 | Hajianpour | |
| D701,050 S | 3/2014 | Yang et al. | |
| D713,056 S | 9/2014 | Gulick | |
| D727,630 S | 4/2015 | Zadro | |
| D736,001 S | 8/2015 | Yang et al. | |
| 9,170,353 B2 | 10/2015 | Chang | |
| D751,829 S | 3/2016 | Yang et al. | |
| D754,446 S | 4/2016 | Yang et al. | |
| 9,347,660 B1 | 5/2016 | Zadro | |
| 9,611,990 B2 | 4/2017 | Ellis | |
| D785,345 S | 5/2017 | Yang et al. | |
| 9,638,410 B2 | 5/2017 | Yang et al. | |
| D801,703 S | 11/2017 | Robertson | |
| D802,942 S | 11/2017 | Nikolov | |
| 9,897,306 B2 | 2/2018 | Yang et al. | |
| D816,350 S | 5/2018 | Yang et al. | |
| D824,681 S | 8/2018 | Vaughn | |
| D841,342 S | 2/2019 | Melocchi | |
| D846,890 S | 4/2019 | Smrstick | |
| D873,034 S | 1/2020 | Boehm | |
| D877,521 S | 3/2020 | Boehm | |
| D877,522 S | 3/2020 | Boehm | |
| 11,209,609 B2 * | 12/2021 | Boehm | A47G 1/02 |
| 11,576,507 B2 * | 2/2023 | Boehm | A47G 1/02 |
| 11,846,829 B2 * | 12/2023 | Boehm | F16B 47/00 |
| 2004/0020509 A1 | 2/2004 | Waisman | |
| 2004/0094934 A1 * | 5/2004 | Teague | B60D 1/36 |
| | | | 280/477 |
| 2004/0165294 A1 | 8/2004 | Dunn | |
| 2004/0233556 A1 | 11/2004 | LaViola | |
| 2005/0146863 A1 | 7/2005 | Mullani | |
| 2007/0247692 A1 | 10/2007 | Rymniak | |
| 2010/0296298 A1 | 11/2010 | Martin, Jr. | |
| 2010/0309159 A1 * | 12/2010 | Roettcher | A47B 81/06 |
| | | | 362/144 |
| 2013/0148336 A1 * | 6/2013 | Griggs | A45D 42/10 |
| | | | 359/872 |
| 2017/0068149 A1 | 3/2017 | Fromm | |
| 2017/0164719 A1 | 6/2017 | Wheeler | |
| 2018/0263362 A1 | 9/2018 | Yang et al. | |
| 2019/0328113 A1 | 10/2019 | Long et al. | |
| 2020/0281342 A1 | 9/2020 | Austin | |
| 2021/0278628 A1 * | 9/2021 | Boehm | F16B 47/00 |

OTHER PUBLICATIONS

Simplehuman Sensor Mirror Compact https://www.simplehuman.com/sensor-mirrors/compact, available at least as of Aug. 10, 2018.

Simplehuman Sensor Mirror Pro, https://www.simplehuman.com/sensor-mirrors/wide-view-pro, available at least as of Aug. 10, 2018.

Simplehuman Sensor Mirror, https://www.simplehuman.com/wall-mount-sensor-mirror, available at least as of Aug. 10, 2018.

Simplehuman Sensor Mirror Pro https://www.simplehuman.com/sensor-mirrors/round/round-pro, available at least as of Aug. 10, 2018.

Magnifying mirror intelligent 6x or 10x TWISTMIRROR, https://www.twistmirror.com/en/twistmirror/47-twistmirror-the-intelligent-magnifying-mirror-6x-or-10x.html, available at least as of Aug. 10, 2018.

Belmont Estate Vanity Mirror, https://www.frontgate.com/belmont-estate-vanity-mirror/731085, available at least as of Aug. 10, 2018.

LED Articulating Rechargeable Vanity Mirror, https://www.frontgate.com/led-articulating-rechargeable-vanity-mirror/1097 010, available at least as of Aug. 10, 2018.

Jerdon 8-Inch Round Lighted Wall Mount Mirror, https://www.bedbathandbeyond.com/store/product/jerdon-reg-8-inch-round-light ed-wall-mount-mirror/3311500, available at least as of Aug. 10, 2018.

Conair Rose 1x/5x Lighted Vanity Mirror in Gold, https://www.bedbathandbeyond.com/store/product/conair-reg-rose-1x-5x-lighted -vanity-mirror-in-gold/1062682275, available at least as of Aug. 10, 2018.

Conair Fluorescent 1x/10x/15x Fluorescent Mirror with Satin Nickle Finish, https://www.bedbathandbeyond.com/store/product/conair-reg-fluorescent-1x-10x-15x-fluor escent-mirror-with-satin-nickel-finish/1015960540, available at least as of Aug. 10, 2018.

Mirrotek Over the Door Mirror, https://www.amazon.com/Mirrotek-Over-the-Door-Mirror/dp/B00UL43110, available at least as of Apr. 4, 2016.

Mar. 16, 2021 Office Action in U.S. Appl. No. 16/548,725.
Sep. 13, 2022 Office Action in U.S. Appl. No. 17/330,543.

(56) References Cited

OTHER PUBLICATIONS

Notice of Allowance dated Jan. 6, 2020 in U.S. Appl. No. 29/661,201, pp. 1-10.
Notice of Allowance dated Jan. 6, 2020 in U.S. Appl. No. 29/661,202, pp. 1-10.
Notice of Allowance dated Apr. 20, 2023 in U.S. Appl. No. 17/330,543, pp. 1-19.
Notice of Allowance dated Aug. 4, 2023 in U.S. Appl. No. 17/330,543, pp. 1-21.
Notice of Allowance dated Sep. 14, 2021 in U.S. Appl. No. 16/548,725, pp. 1-19.
Notice of Allowance dated Oct. 2, 2019 in U.S. Appl. No. 29/661,199, pp. 1-30.
Notice of Allowance dated Dec. 19, 2022 in U.S. Appl. No. 17/537,303, pp. 1-7.
Office Action dated Mar. 16, 2021 in U.S. Appl. No. 17/330,543, pp. 1-25.
Office Action dated Sep. 24, 2019 in U.S. Appl. No. 29/661,201, pp. 1-23.
Office Action dated Sep. 24, 2019 in U.S. Appl. No. 29/661,202, pp. 1-23.

\* cited by examiner

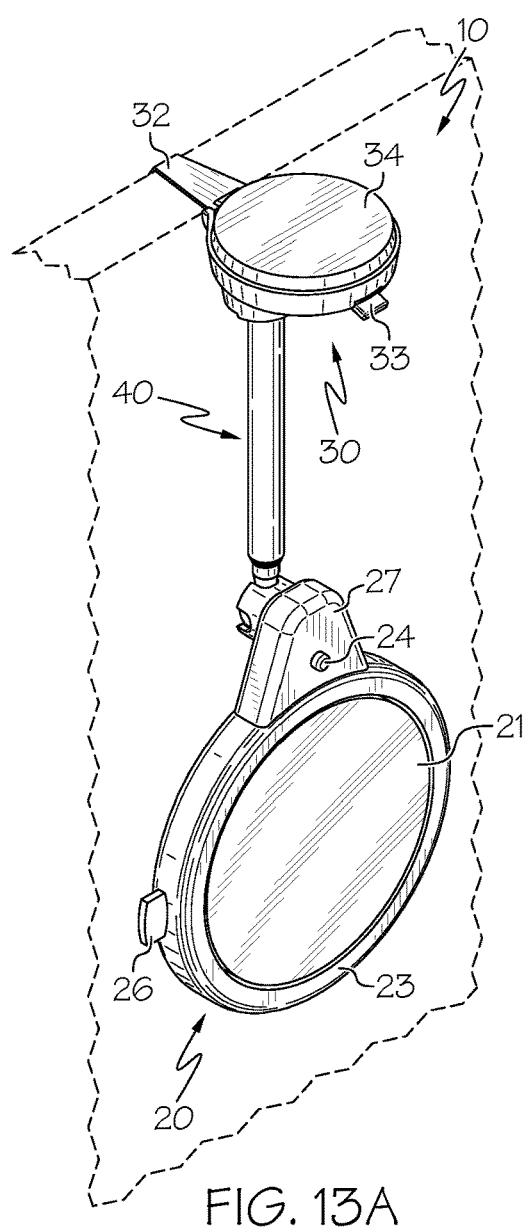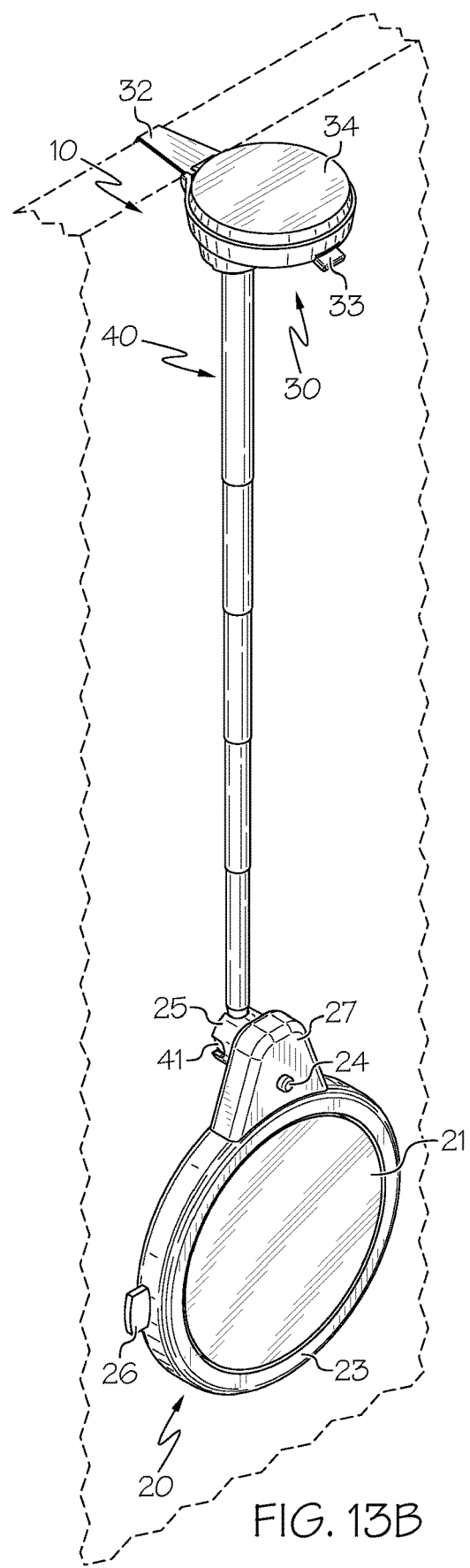
FIG. 13A
FIG. 13B

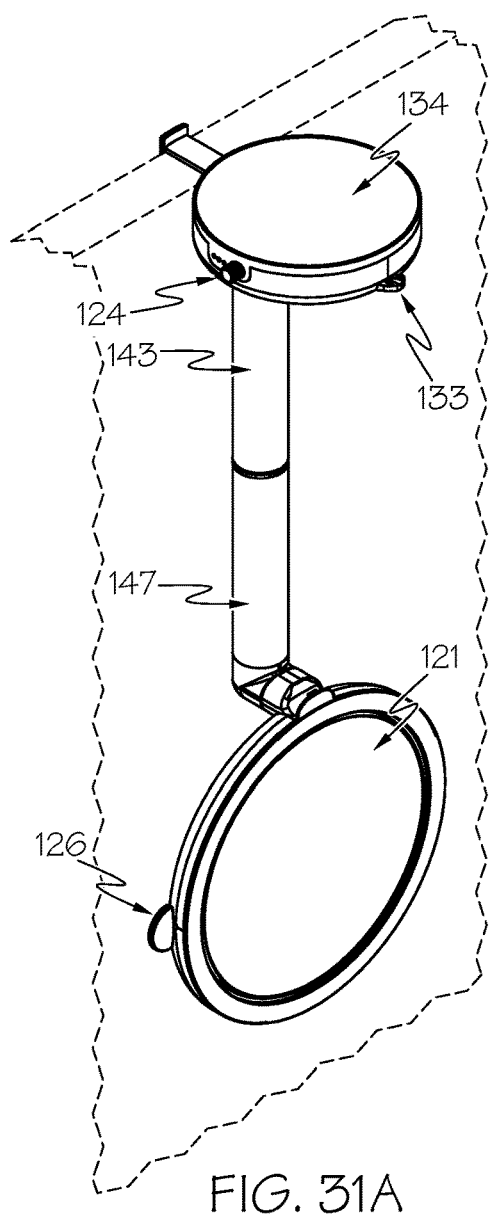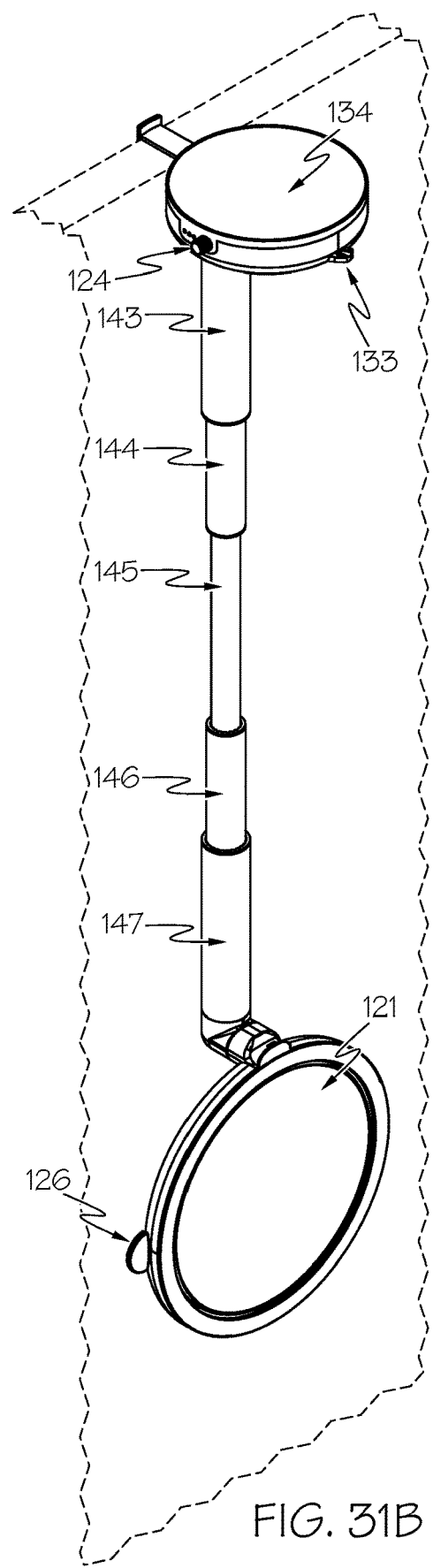
FIG. 31A
FIG. 31B

ADJUSTABLE VANITY MIRROR WITH HANGER BRACKET AND SUCTION CUP

CROSS-REFERENCES TO RELATED APPLICATIONS

This application is a continuation of, and claims priority to, U.S. patent application Ser. No. 17/537,303 filed Nov. 29, 2021, which is a continuation-in-part of and claims the benefit of U.S. patent application Ser. No. 16/548,725, filed Aug. 22, 2019, now U.S. Pat. No. 11,209,609, which claims the benefit of prior Provisional Application No. 62/722,749, filed on Aug. 24, 2018, each of which is incorporated by reference as though fully set forth herein.

FIELD OF THE INVENTION

The present disclosure relates generally to vanity mirrors.

BACKGROUND OF THE INVENTION

Vanity mirrors are reflective devices that are typically used for personal grooming, shaving, applying makeup, or the like.

Vanity mirrors are available in various configurations, including wall-mounted, free-standing, and hand-held. A common problem, however, with each of these configurations is that users of the mirror must reposition themselves to obtain the desired distance from the reflective surface and the requisite height for the reflective surface to be viewable. This repositioning is particularly undesirable when the user is required to bend over to reach the desired height and distance, which may cause back and neck pain. In the case of a hand-held mirror, the user may be able to reposition the mirror but must hold the mirror at the desired location, thereby reducing their ability to perform the required grooming tasks.

The present invention solves these problems by providing a hands-free, adjustable mirror assembly with a suction cup base, hanger bracket, swivel joint, telescoping rod, and light source with diffuser screen. The suction cup base allows the user to position the mirror assembly at the desired distance, height, and angle from the user while maintaining the stability of the mirror assembly. Advantageously, the swivel joint allows the user to rotate the mirror about the axis of the swivel joint, thereby allowing a user of the mirror to achieve the desired mirror position in relation to the position of the user. For example, if the user is seated while using the mirror, the swivel joint allows the user to rotate the mirror to a height that permits the user to more comfortably view the mirror at the angle desired by the user. The swivel joint may be operated by, for example, rotating the mirror about the axis of the swivel joint. The swivel joint also permits a user to adjust the position of the mirror in a one-step process that does not require the user to fold the mirror such that the light source no longer faces the user. The swivel joint may include a spring-loaded pin mechanism that permits the user to lock the mirror in the desired position. The swivel joint also permits a user to rotate the mirror housing for more compact storage and transport of the mirror assembly, thereby increasing portability and convenience. The light source may include a diffuser screen to diffuse light emitted by the light source thereby providing a uniform light glow. Additionally, the light source may automatically deactivate after a certain period of time, for example, 20 minutes, thereby conserving battery power when the mirror assembly is not plugged in to an electrical outlet. Moreover, when the light source is set to the user's desired dimmer setting and the light source is deactivated and later reactivated, the light source will return to the previous dimmer setting. Additionally, the hanger bracket permits the user to hang the mirror assembly at the desired height and position over a door or ledge while maintaining the stability of the mirror assembly. These features permit the user of the present invention to stand or sit, as desired, and permit the user to move the mirror assembly disclosed herein to the desired location rather than bending over to reach the desired distance from the reflective surface, thereby potentially avoiding causing back and neck pain. The ability to hang the present mirror assembly over a door or ledge also provides the user with the ability to utilize the mirror assembly in a variety of locations.

BRIEF SUMMARY OF THE INVENTION

The present invention relates to a novel mirror assembly comprising a mirror, suction cup base with a hanger bracket, swivel joint, adjustable telescoping rod, and light source with diffuser screen.

A hands-free, adjustable telescoping magnifying mirror with a swivel joint, adjustable telescoping rod, and light source with diffuser screen is provided. The mirror can be secured to a horizontal or vertical surface using a suction cup base or can be hung over a door or ledge using a retractable hanger bracket. A telescoping rod is attached to the suction cup base. The mirror may be extended from the base by extending the telescoping rod and the mirror assembly can stand freely without falling over, whether the suction cup base is engaged or not. Advantageously, the telescoping rod may have a base stage and four additional stages, wherein the base stage has a certain diameter, stages one and two have progressively decreasing diameters, and stages three and four have progressively increasing diameters such that the diameter of stage four may be equal to the diameter of the base stage. This multi-stage configuration is advantageous because, for example, it permits the use of a larger connection point for attachment of a joint, such as a swivel joint, to secure the telescoping rod to the mirror housing, thereby increasing the stability and strength of the joint while also allowing stage four of the telescoping rod to cover the joint, thereby additionally providing aesthetic benefits. A smooth disc may also supplied to increase stability of the mirror assembly by removably mounting the suction cup base to the disc, giving the base a larger footprint.

As previously discussed, the swivel joint provides several advantages, including increased repositionability and increased portability and convenience. Additionally, as previously discussed, the light source with diffuser screen provides several advantages, including providing a uniform light glow and automatic deactivation when the mirror assembly is using battery power.

In one embodiment, the mirror assembly has a first reflective surface disposed on a first side of the mirror and second reflective surface disposed on a second side of the mirror. The first reflective surface and second reflective surface may be magnifying or non-magnifying and may have different levels of magnification than one another. The mirror may also have a lever that when triggered rotates the first reflective surface and second reflective surface relative to light source or sources about an axis normal to the vertical axis of the telescoping rod, for example, thereby allowing a user to view the reflective surface that provides the desired magnification level. Advantageously, the mirror may include a clamp brake that adds friction to the rotation of the first and second reflective surfaces, thereby enhancing the user's ability to make back-and-forth adjustments to the position of the reflective surfaces and increasing the ability of the first and second reflective surfaces to remain in the desired position.

BRIEF DESCRIPTION OF THE DRAWINGS

FIG. 13A illustrates a front perspective view of an embodiment of a mirror assembly with the hanger bracket extended and engaged over a door or ledge.

FIG. 13B illustrates a front perspective view of an embodiment of a mirror assembly with the hanger bracket extended and engaged over a door or ledge.

FIG. 31A illustrates a front perspective view of an embodiment of a mirror assembly with the hanger bracket extended and engaged over a door or ledge.

FIG. 31B illustrates a front perspective view of an embodiment of a mirror assembly with the hanger bracket extended and engaged over a door or ledge.

DETAILED DESCRIPTION OF CERTAIN EMBODIMENTS

Figure 1:
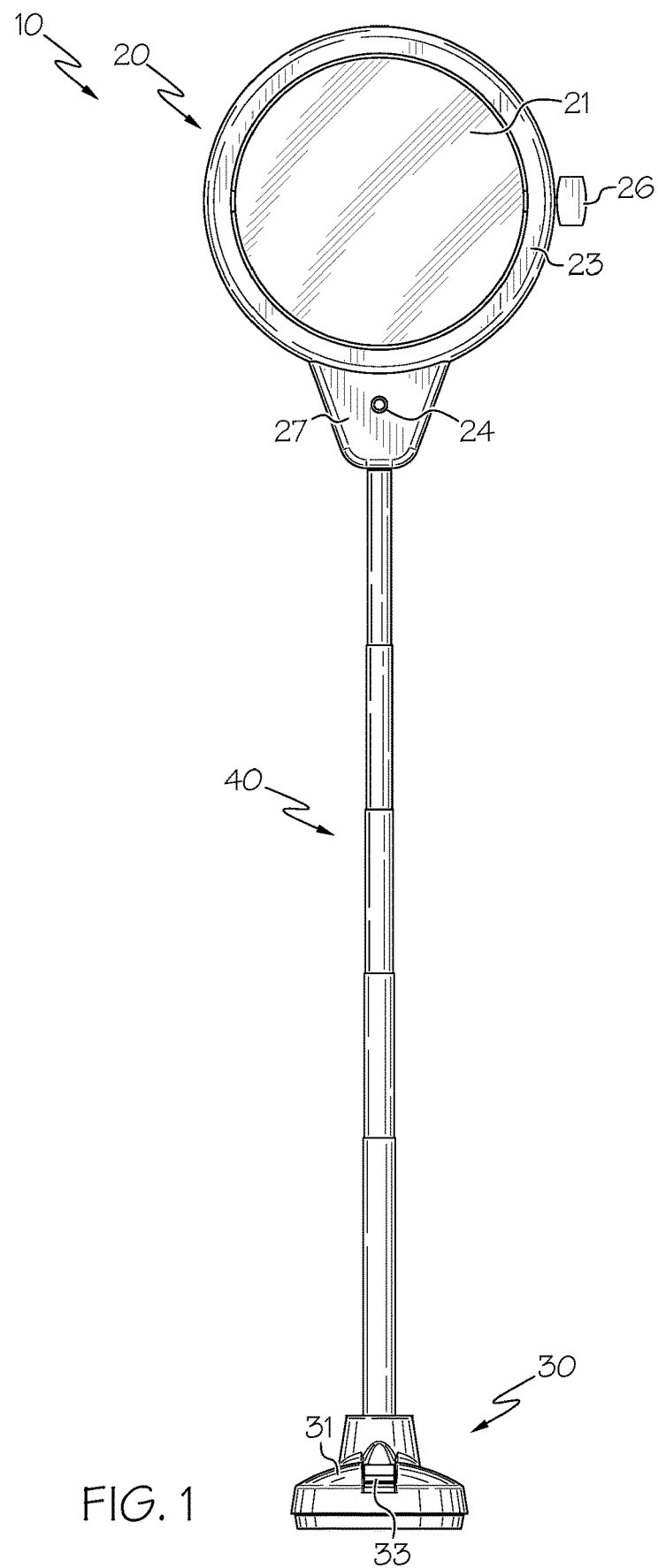
FIG. 1 illustrates a front view of an embodiment of a mirror assembly with the telescoping rod extended and trigger arm engaged.
Figure 2:
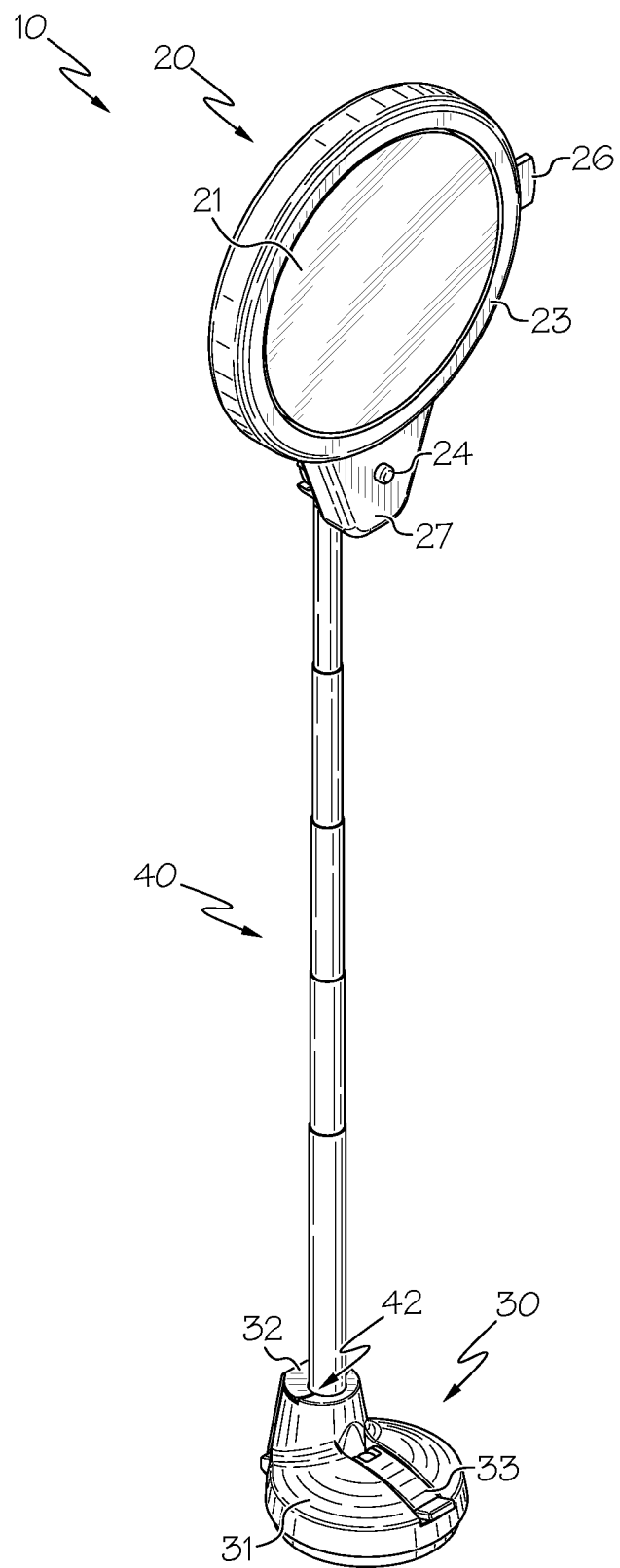
FIG. 2 illustrates a front perspective view of an embodiment of a mirror assembly with the telescoping rod extended, trigger arm engaged, and hanger bracket retracted.
Figure 3:
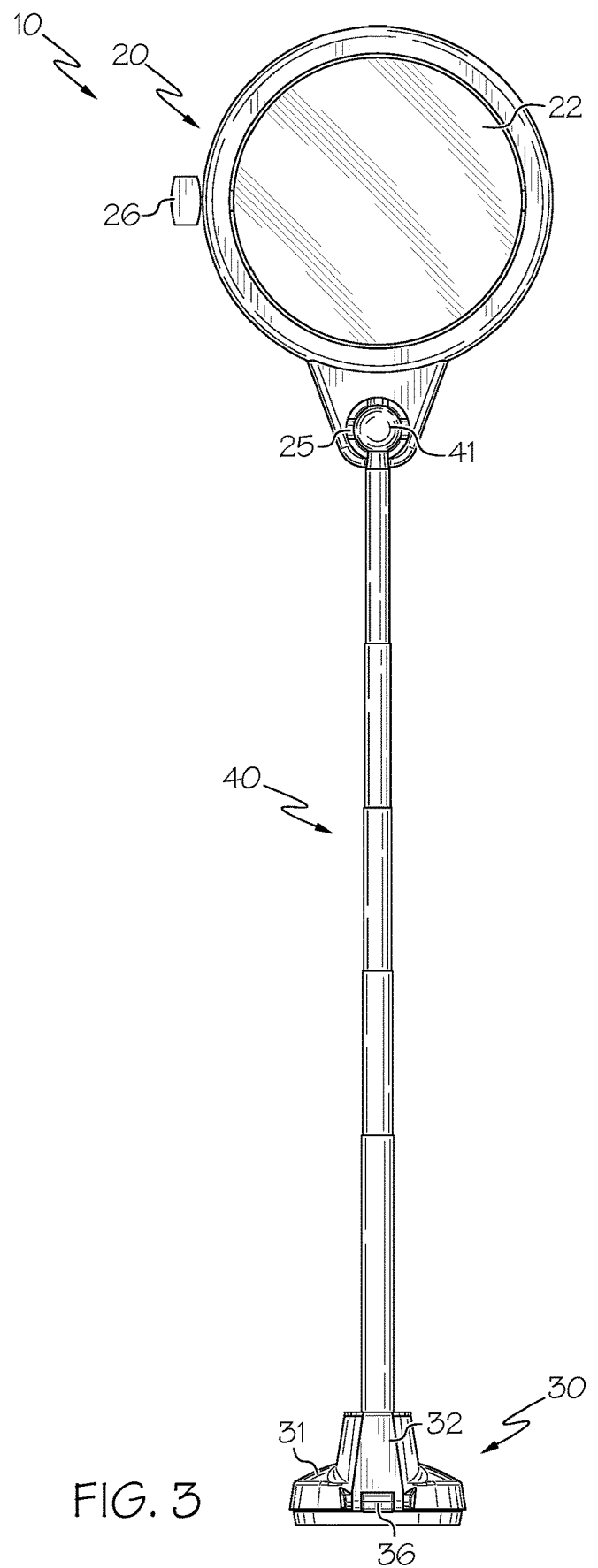
FIG. 3 illustrates a rear view of an embodiment of a mirror assembly with the telescoping rod extended and hanger bracket retracted.

In one embodiment, a mirror assembly 10 comprises a mirror 20, a suction cup base assembly 30, and a telescoping rod 40. Mirror 20 may have a first reflective surface 21 on a first side and a second reflective surface 22 on a second side. Additionally, there may be one or more light sources 23 disposed at a periphery of first reflective surface 21 or second reflective surface 22. The light source or sources 23 may be powered by a battery (e.g., a rechargeable battery) or may be plugged into an electrical outlet, for example. The light source or sources 23 may be activated and deactivated by a switch 24, or the like, which may be located adjacent the light source 23 on the front side of housing 27, on the reverse side of housing 27, or in the suction cup base assembly 30, for example. Switch 24 may be a push-button toggle switch, for example, or may be a rotatable knob that allows a user to adjust the intensity of light emitted by light source 23 by rotating the knob in a clockwise or counter-clockwise direction. Housing 27 may have a socket 25 for use in a ball joint by which a first end 41 of telescoping rod 40 may be secured to housing 27. The mirror 20 may also have a lever 26 that when triggered rotates reflective surfaces 21 and 22 relative to light source or sources 23 about an axis normal to the vertical axis of telescoping rod 40, for example, thereby allowing a user to view the reflective surface that provides the desired magnification level. A person of ordinary skill in the art would understand that other methods and axes of rotation may be used to rotate reflective surfaces 21 and 22. Each reflective surface 21 and 22 may be non-magnifying or may be magnifying, and each may provide level a of magnification of, for example, 1×, 3×, 5×, 7×, 10×, 15×, or 20×.

In some embodiments, the suction cup base assembly 30 is substantially hemispherical in shape, comprising a round, flexible, concave diaphragm 34 (i.e., a suction cup) on the front side of the planar surface of the hemisphere. The suction cup base assembly 30 can comprise multiple suction cups, but preferably uses only one suction cup 34 in order to reduce the size and weight of the mirror assembly 10, thereby increasing portability. The suction cup 34 may be used to removably mount the mirror assembly 10 to a horizontal or vertical surface. The suction cup 34 may be a locking suction cup or a non-locking suction cup. A housing portion 31 is disposed on the reverse side of the planar surface of the hemisphere. The housing portion 31 is preferably made of a water-, abrasion-, and stain-resistant material, such as plastic. A material such as plastic will resist discoloration and rust that may occur due to conditions in which the mirror assembly may be utilized, e.g., in a damp environment such as a bathroom, adjacent to a water source such as a sink, or near substances that may stain or discolor such as makeup or other grooming products. The plastic material from which the housing portion 31 of the suction cup base assembly 30 is preferably comprised may also be flexible such that it will not crack or break if the mirror assembly 10 is dropped. If the suction cup 34 is a locking suction cup, the housing portion 31 of the suction cup base assembly 30 may also include a trigger arm 33 for engaging the suction cup 34 such that it becomes removably mounted to a horizontal or vertical surface. Additionally, due to the conditions in which the mirror assembly 10 may be utilized, e.g., in a damp environment such as a bathroom, or adjacent to a water source such as a sink, it is preferable for the trigger arm 33 to be comprised of a water- and rust-resistant material such as stainless steel or aluminum. Those of skill in the art, however, would understand that the trigger arm 33 can be comprised of any suitable material.

The suction cup base assembly 30 may also include a hanger bracket 32. The hanger bracket 32 provides support for the mirror assembly 10 to be hung in an inverted manner on a door, a ledge, or the like. To permit the mirror assembly 10 to be hung in an inverted manner from a door, ledge, or the like, the hanger bracket 32 preferably has an internal dimension sufficient to accommodate the minimum and maximum standard thickness of an interior door. The hanger bracket 32 may be shaped as shown, for example, in FIGS. 9, 10, and 13, or may be shaped in any manner suitable to allow it to support the mirror assembly 10 over a door, ledge, or the like. The hanger bracket 32 is preferably made of metal, such as stainless steel, so that it can adequately support the mirror assembly 10 and is preferably thin enough to permit the door on which the mirror assembly 10 may be hung to be closed. Additionally, due to the conditions in which the mirror assembly 10 may be utilized, e.g., in a damp environment such as a bathroom, or adjacent to a water source such as a sink, it is preferable for the hanger bracket 32 to be comprised of a water- and rust-resistant material such as stainless steel. Those of skill in the art, however, would understand that the hanger bracket 32 can be comprised of any suitable material.

Figure 4:
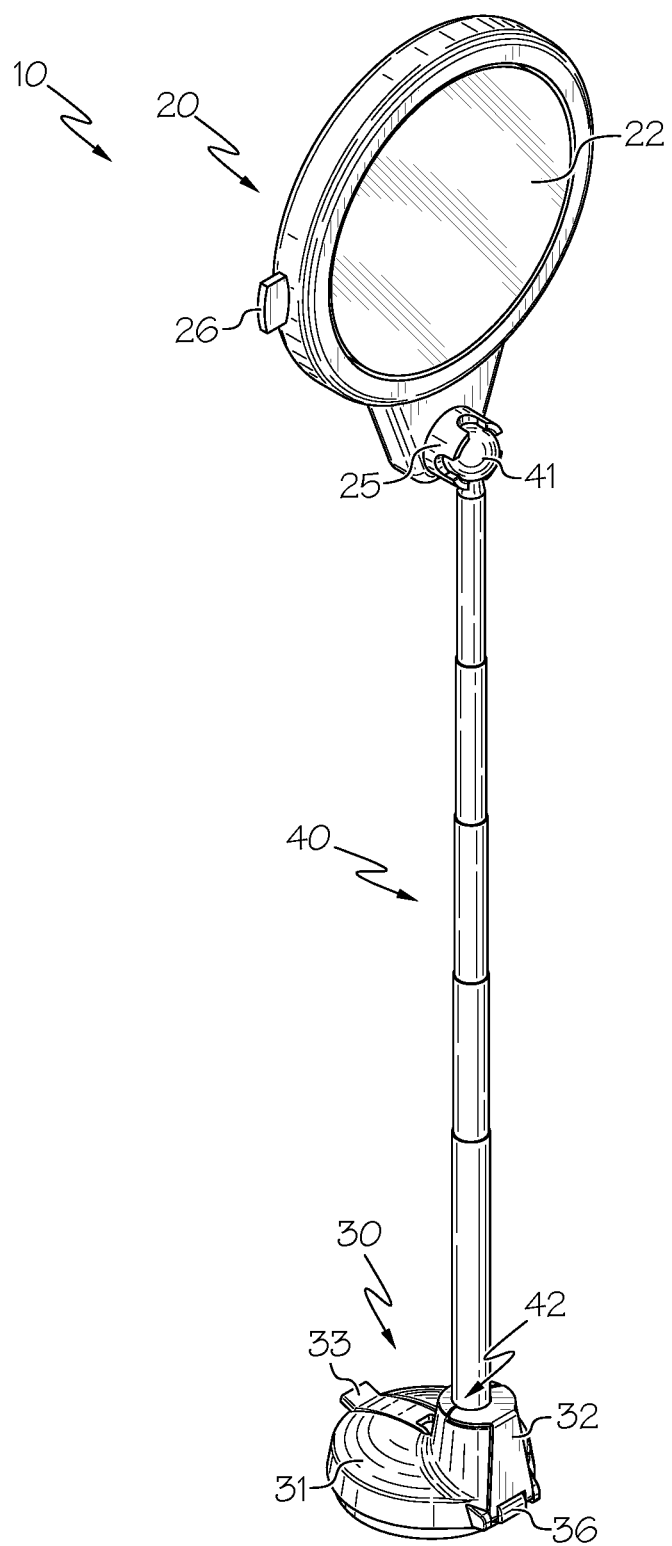
FIG. 4 illustrates a rear perspective view of an embodiment of a mirror assembly with the telescoping rod extended, trigger arm engaged, and hanger bracket retracted.
Figure 5:
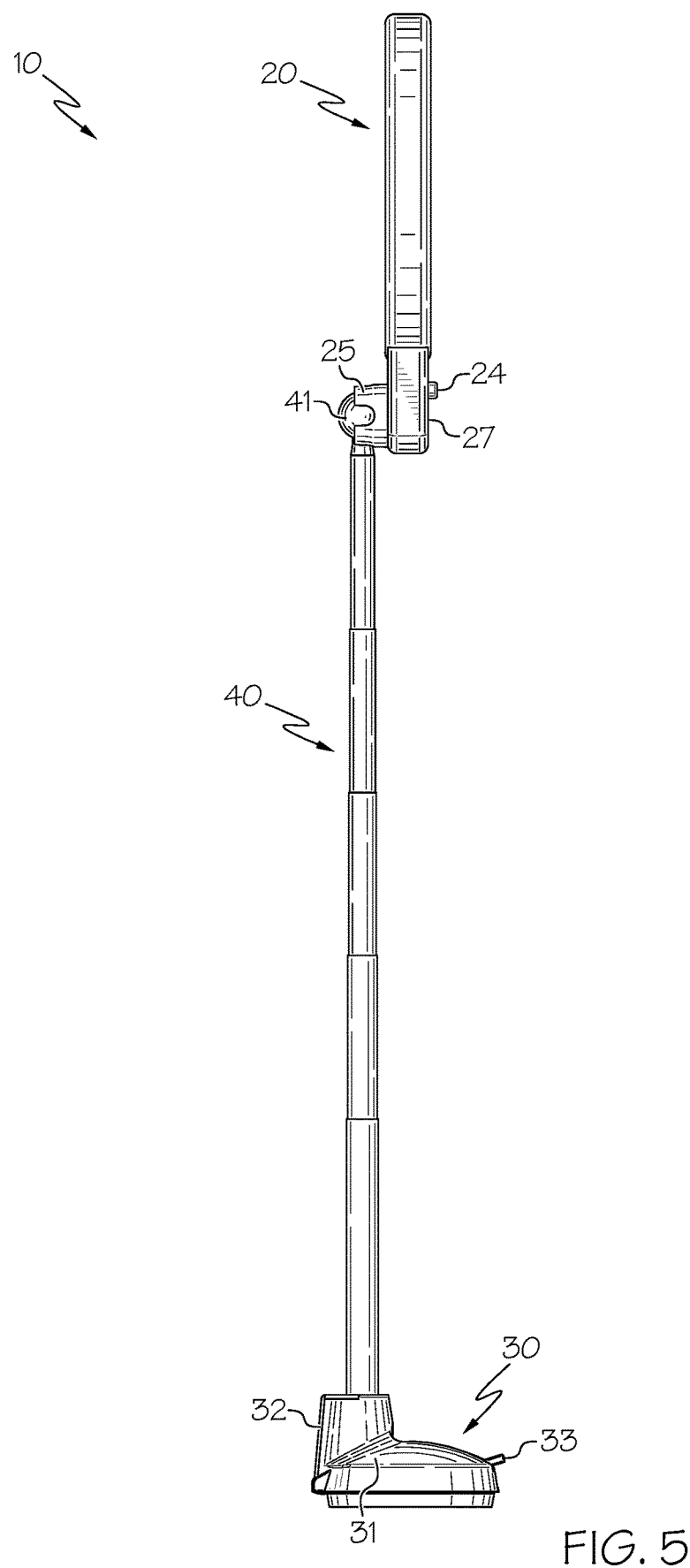
FIG. 5 illustrates a side view of an embodiment of a mirror assembly with the telescoping rod extended, trigger arm engaged, and hanger bracket retracted.
Figure 6:
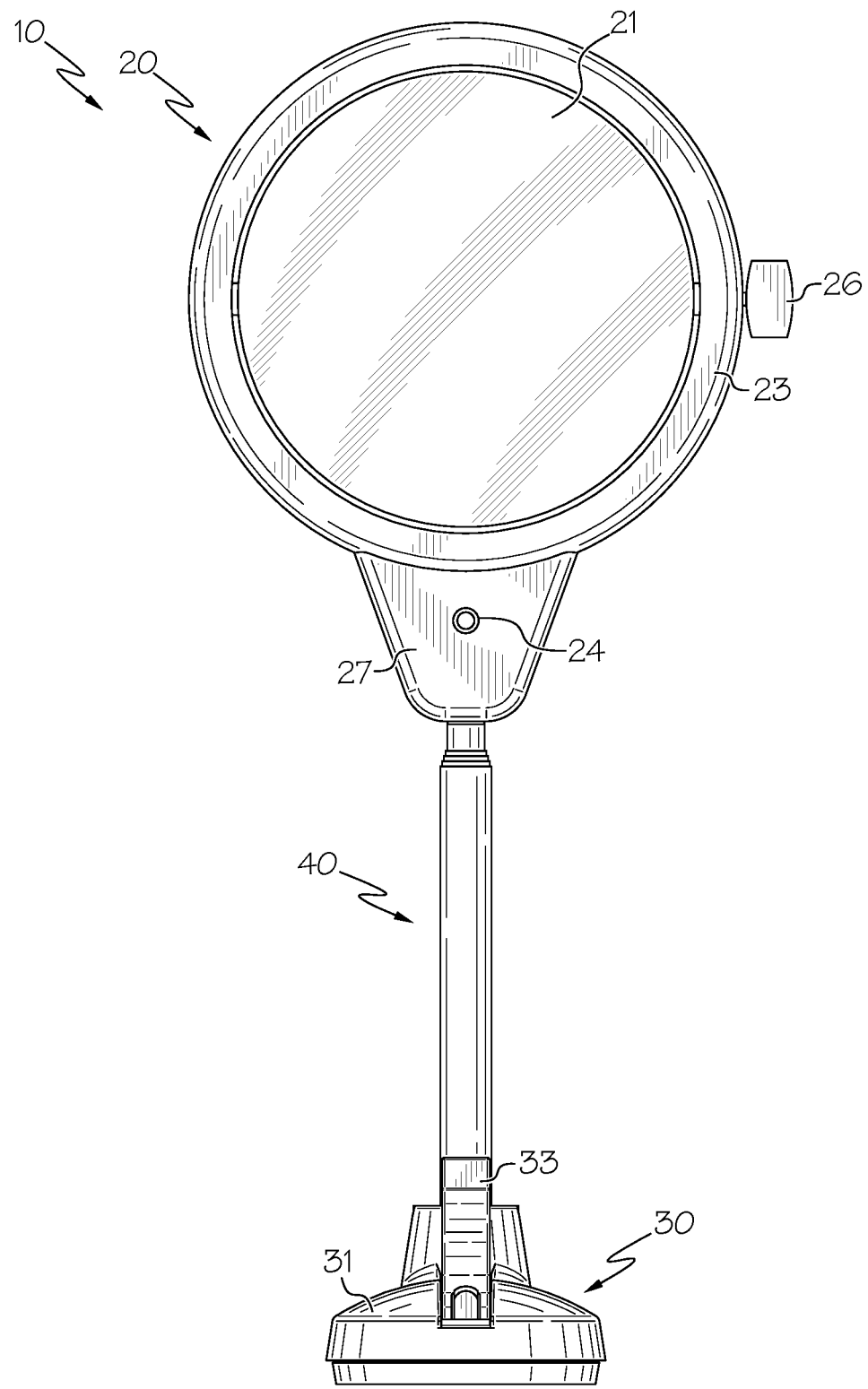
FIG. 6 illustrates a front view of an embodiment of a mirror assembly with the telescoping rod retracted and trigger arm disengaged.
Figure 7:
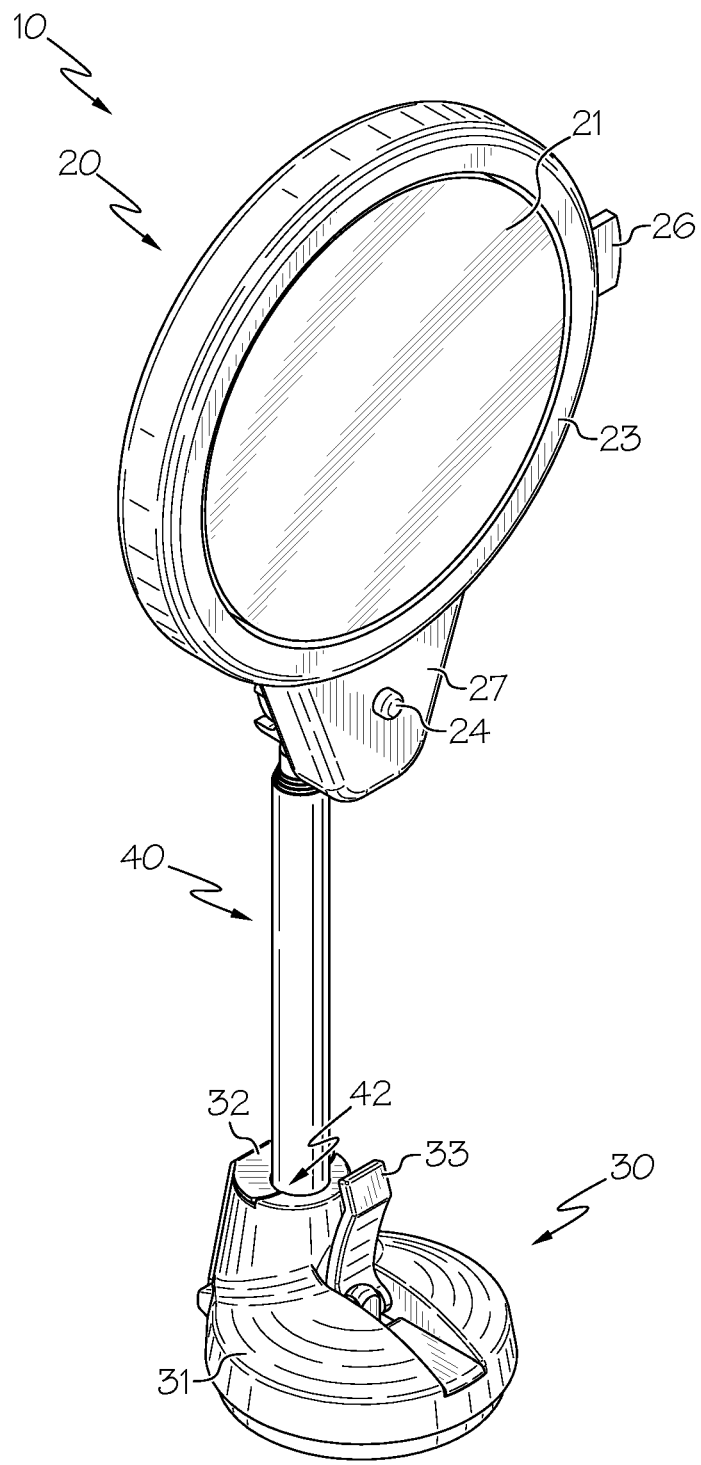
FIG. 7 illustrates a front perspective view of an embodiment of a mirror assembly with the telescoping rod retracted, trigger arm disengaged, and hanger bracket retracted.
Figure 8:
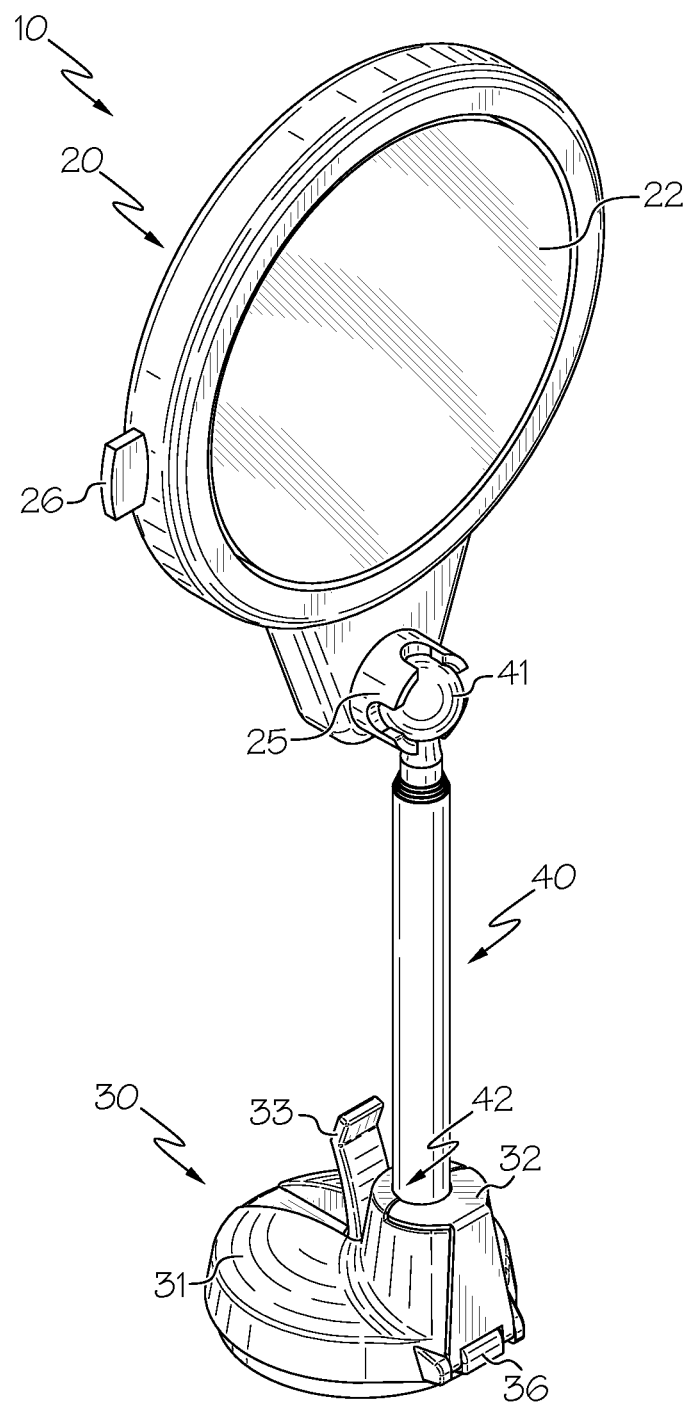
FIG. 8 illustrates a rear perspective view of an embodiment of a mirror assembly with the telescoping rod retracted, trigger arm disengaged, and hanger bracket retracted.
Figure 9:
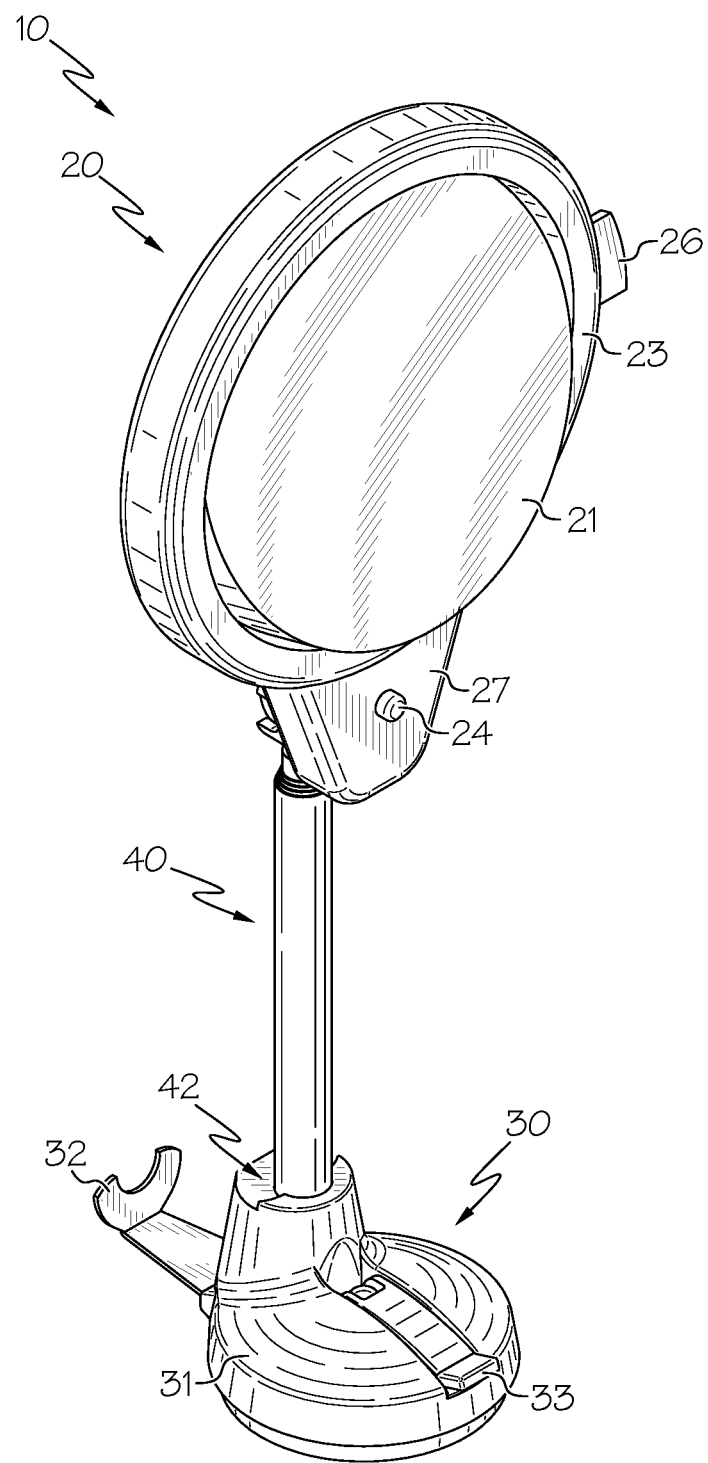
FIG. 9 illustrates a front perspective view of an embodiment of a mirror assembly with the telescoping rod retracted, trigger arm engaged, hanger bracket extended, and reflective surfaces partially rotated.
Figure 10:
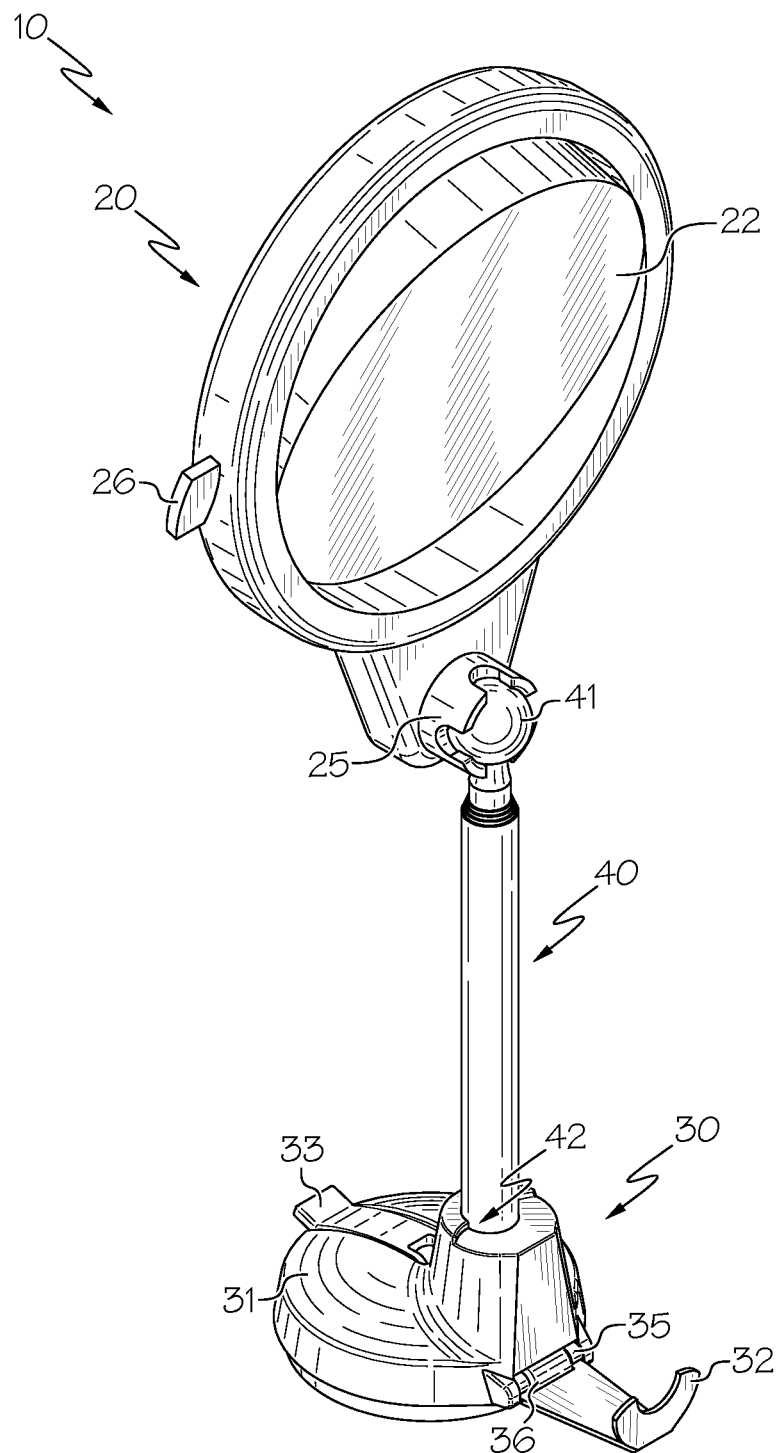
FIG. 10 illustrates a rear perspective view of an embodiment of a mirror assembly with the telescoping rod retracted, trigger arm engaged, hanger bracket extended, and reflective surfaces partially rotated.
Figure 11A:
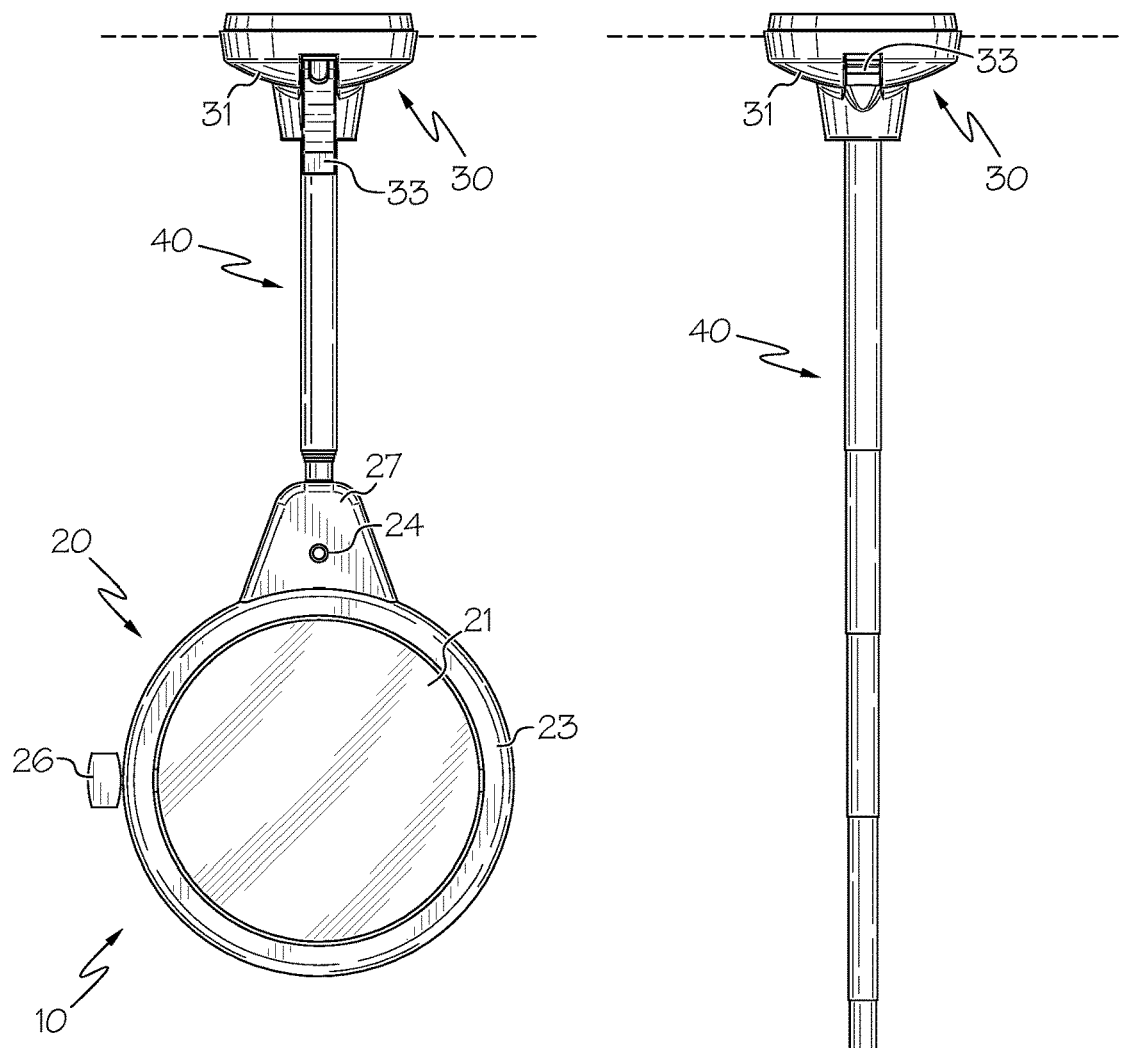
FIG. 11A illustrates a front view of an embodiment of a mirror assembly with the hanger bracket extended and engaged over a door or ledge.
Figure 11B:
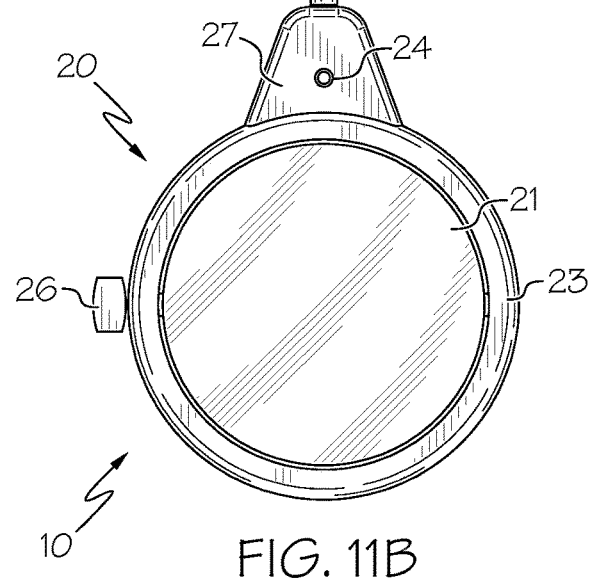
FIG. 11B illustrates a front view of an embodiment of a mirror assembly with the hanger bracket extended and engaged over a door or ledge.
Figure 12A:
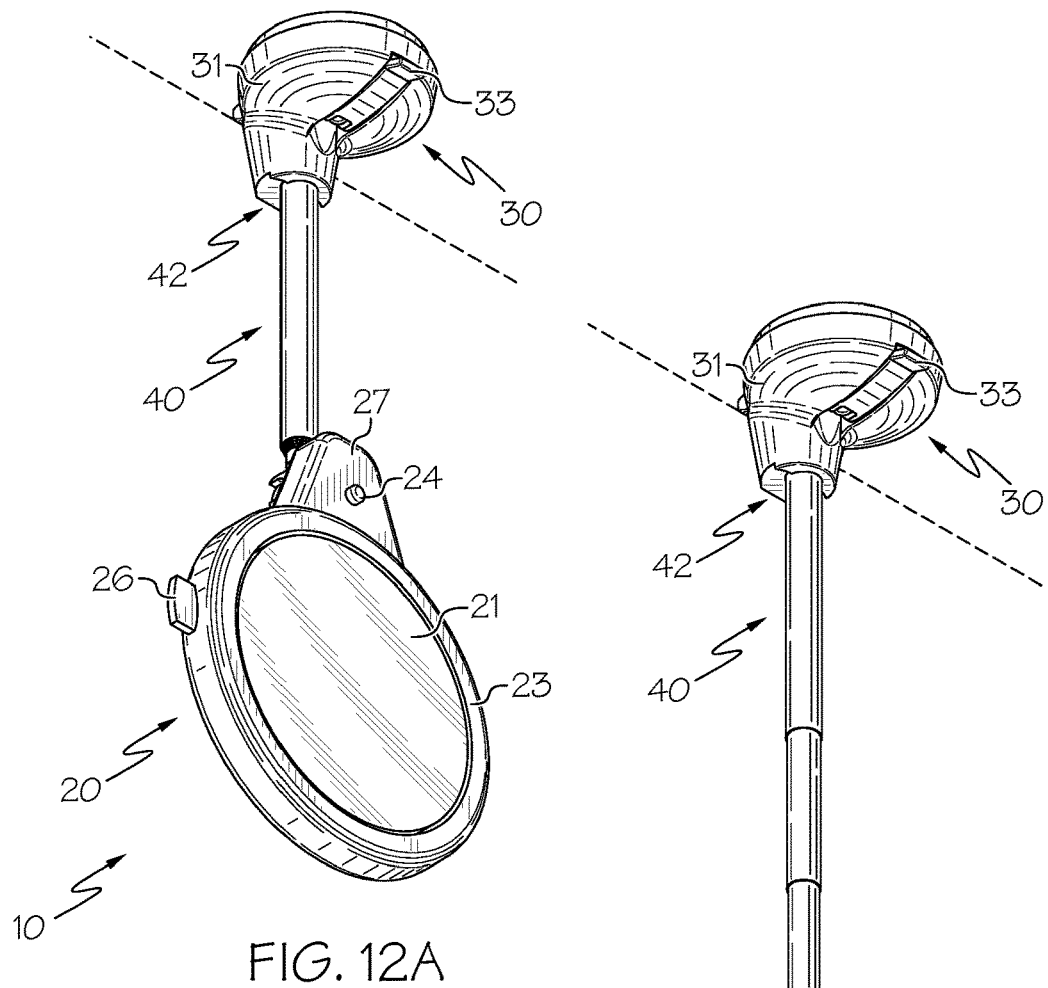
FIG. 12A illustrates a bottom perspective view of an embodiment of a mirror assembly with the hanger bracket extended and engaged over a door or ledge.
Figure 12B:
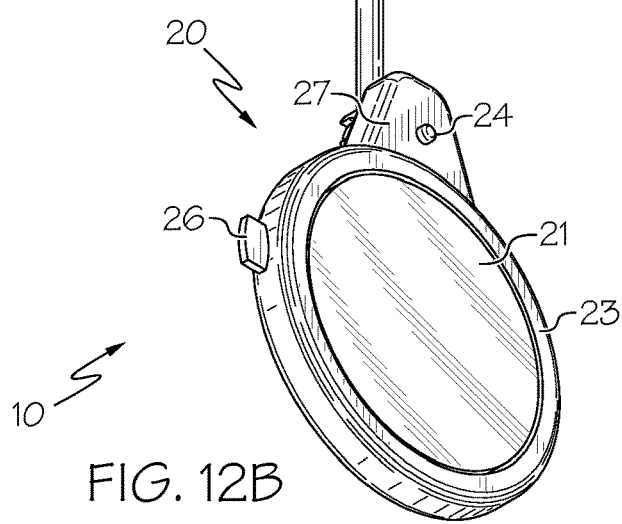
FIG. 12B illustrates a bottom perspective view of an embodiment of a mirror assembly with the hanger bracket extended and engaged over a door or ledge.
Figure 14:
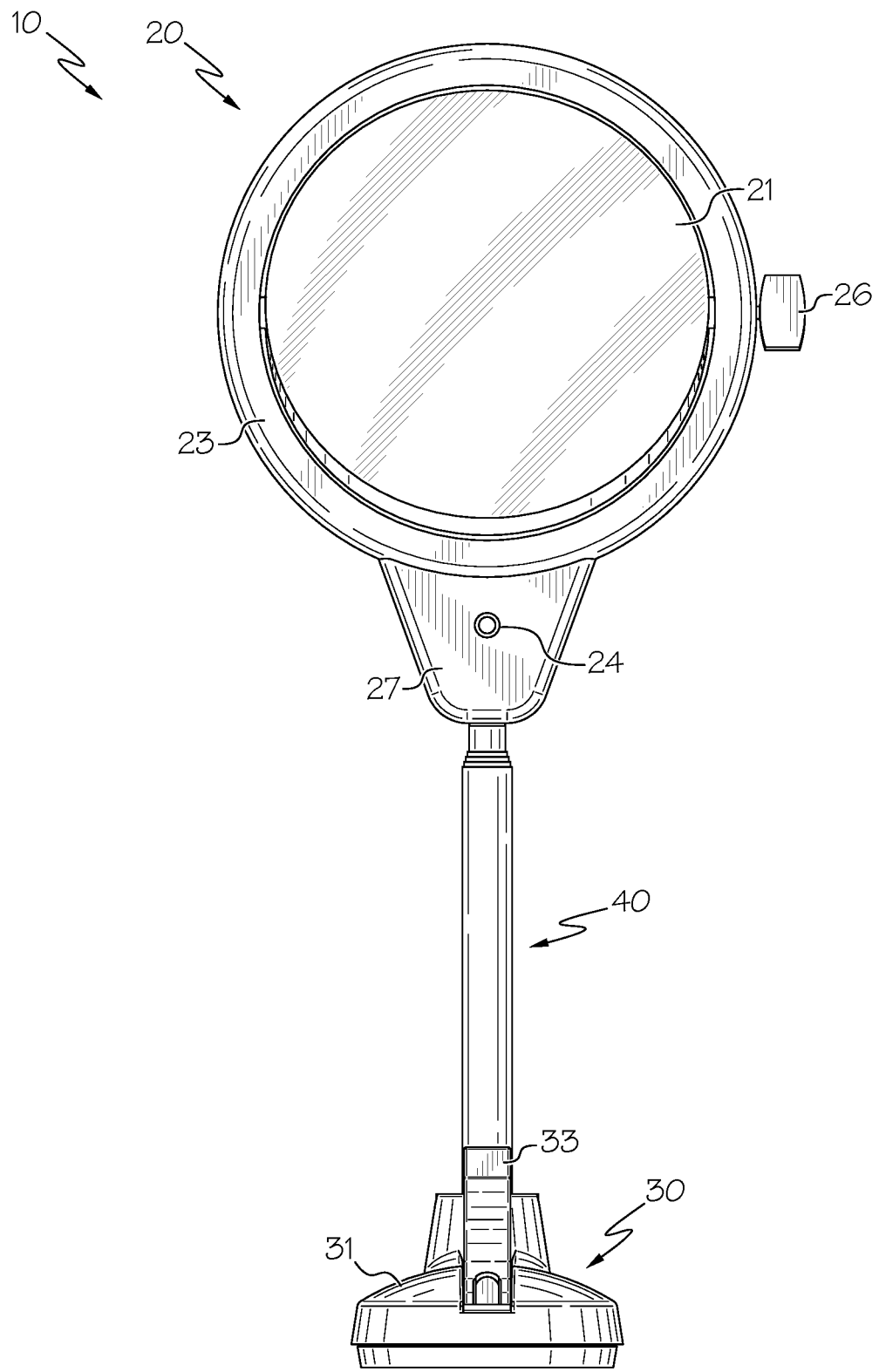
FIG. 14 illustrates a front view of an embodiment of a mirror assembly with the telescoping rod retracted, trigger arm disengaged, and reflective surfaces partially rotated.
Figure 15:
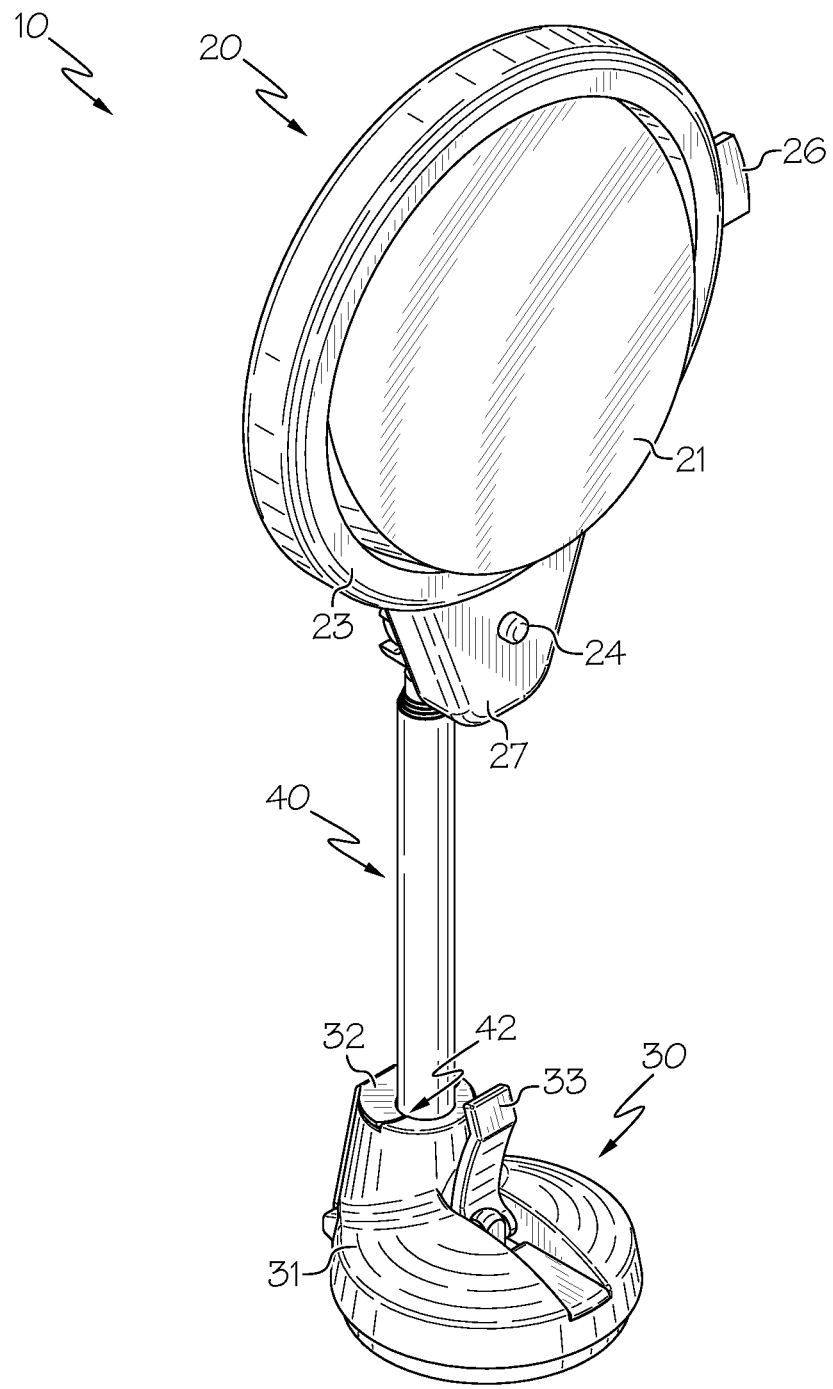
FIG. 15 illustrates a front perspective view of an embodiment of a mirror assembly with the telescoping rod retracted, trigger arm disengaged, hanger bracket retracted, and reflective surfaces partially rotated.
Figure 16:
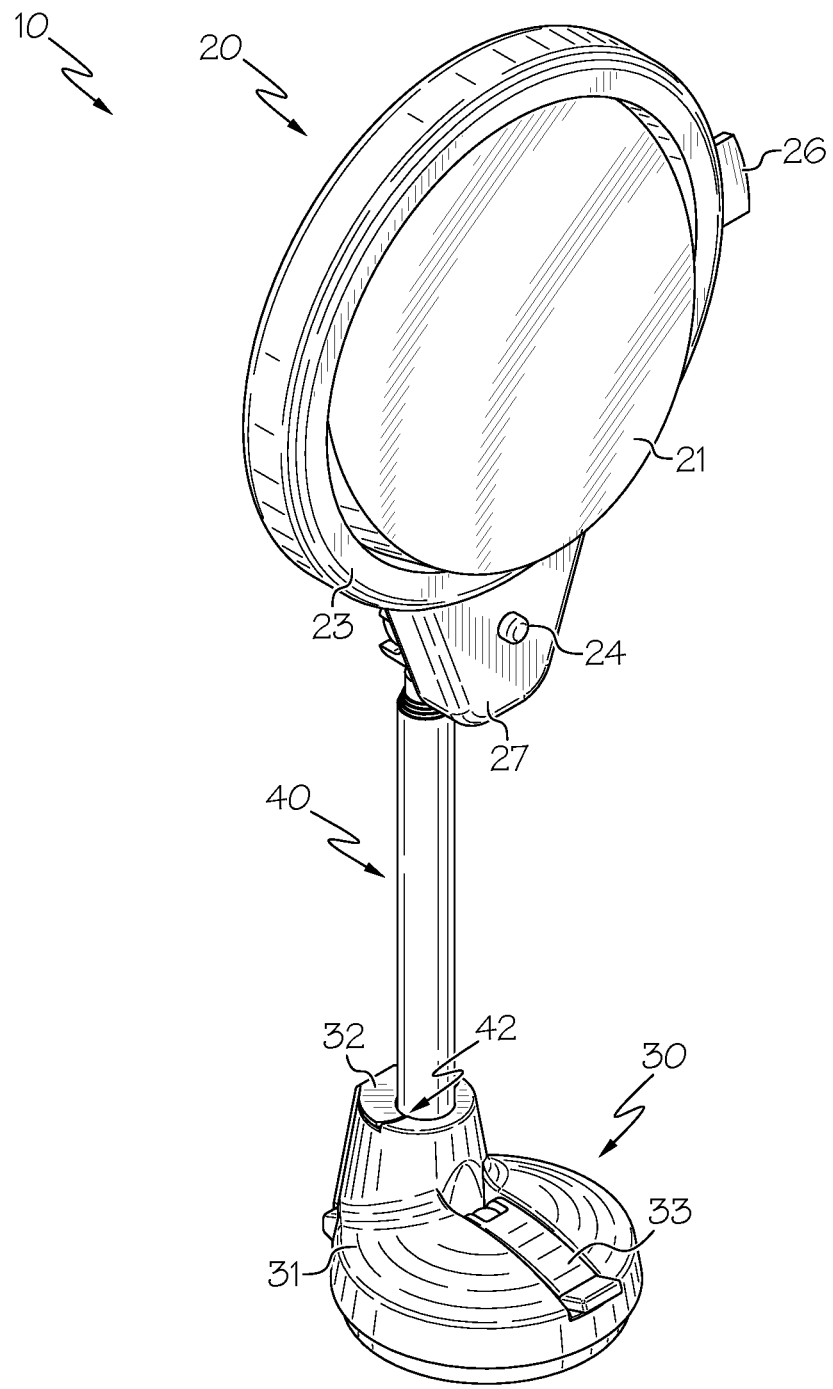
FIG. 16 illustrates a front perspective view of an embodiment of a mirror assembly with the telescoping rod retracted, trigger arm engaged, hanger bracket retracted, and reflective surfaces partially rotated.
Figure 17:
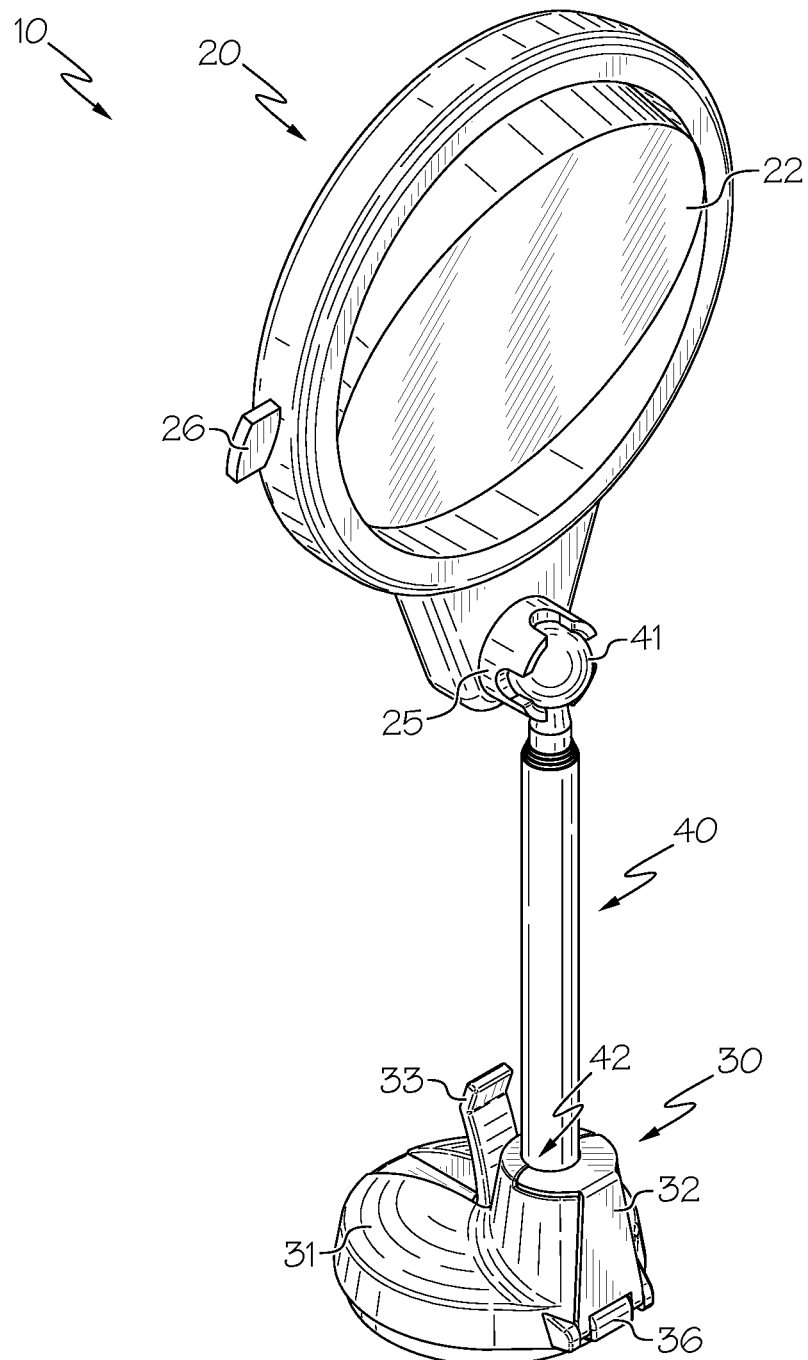
FIG. 17 illustrates a rear perspective view of an embodiment of a mirror assembly with the telescoping rod retracted, trigger arm disengaged, hanger bracket retracted, and reflective surfaces partially rotated.
Figure 18:
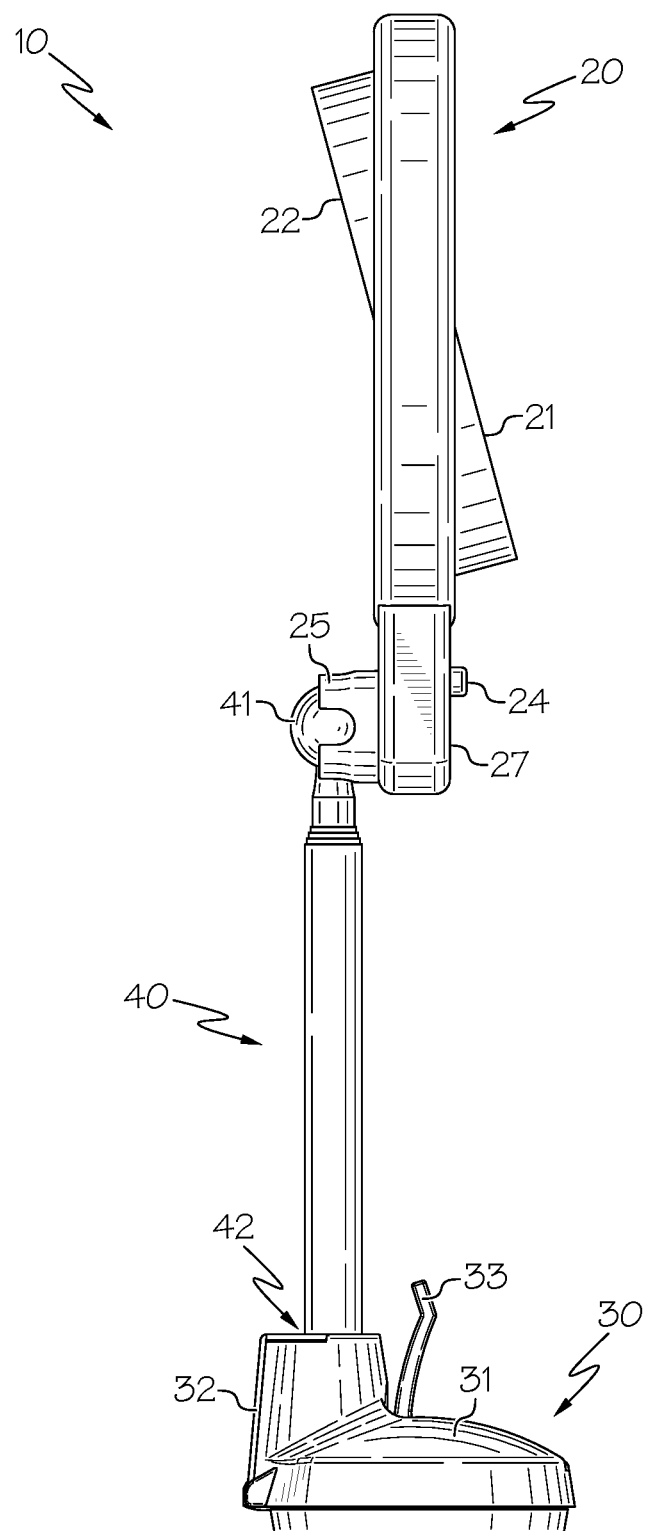
FIG. 18 illustrates a side view of an embodiment of a mirror assembly with the telescoping rod retracted, trigger arm disengaged, hanger bracket retracted, and reflective surfaces partially rotated.

The hanger bracket 32 is secured to hinge plate 36 of the suction cup base assembly 30 using a hinge assembly 35. The hinge assembly 35 permits the hanger bracket 32 to extend as shown in FIG. 9, and retract, as shown in FIG. 4, thereby facilitating the compact storage or transport of the mirror assembly 10. The hinge assembly 35 may include a roll pin to support the hanger bracket 32 when it is used to hang the mirror assembly 10 from a door, ledge, or the like. In some embodiments, the hinge assembly 35 may use a solid pin or set screws to support the hanger bracket 32 when it is used to hang the mirror assembly 10 from a door, ledge, or the like. A physical stop is molded into hinge plate 36 to prevent the hanger bracket 32 from rotating further than 90° relative to the suction cup base assembly 30.

A telescoping rod 40 extends between the suction cup base assembly 30 and the mirror 20. In some embodiments, the first end 41 of the telescoping rod 40 is secured to the housing 27 of the mirror 20 using a ball joint. The ball joint allows the user of the mirror assembly 10 to pivot and adjust the mirror 20 to obtain the desired position. The second end 42 of the telescoping rod 40 is secured to the housing portion 31 of the suction cup base assembly 30, by, for example, a swivel joint such that the suction cup base assembly 30 may be stored against the telescoping rod 40 when the mirror assembly 10 is not in use, thereby facilitating the compact storage or transport of the mirror assembly 10. The telescoping rod 40 may be retracted or extended in order to adjust the height of the mirror 20 or distance from the user or to facilitate the compact storage or transport of the mirror assembly 10.

Additionally, a smooth disc of, for example, 5" in diameter, may be provided to enhance the stability of the mirror assembly 10 when the telescoping rod 40 is fully extended by removably mounting the suction cup base assembly 30 to the disc using the suction cup 34, thereby providing a larger footprint and increased stability to the mirror assembly 10.

Figure 19:
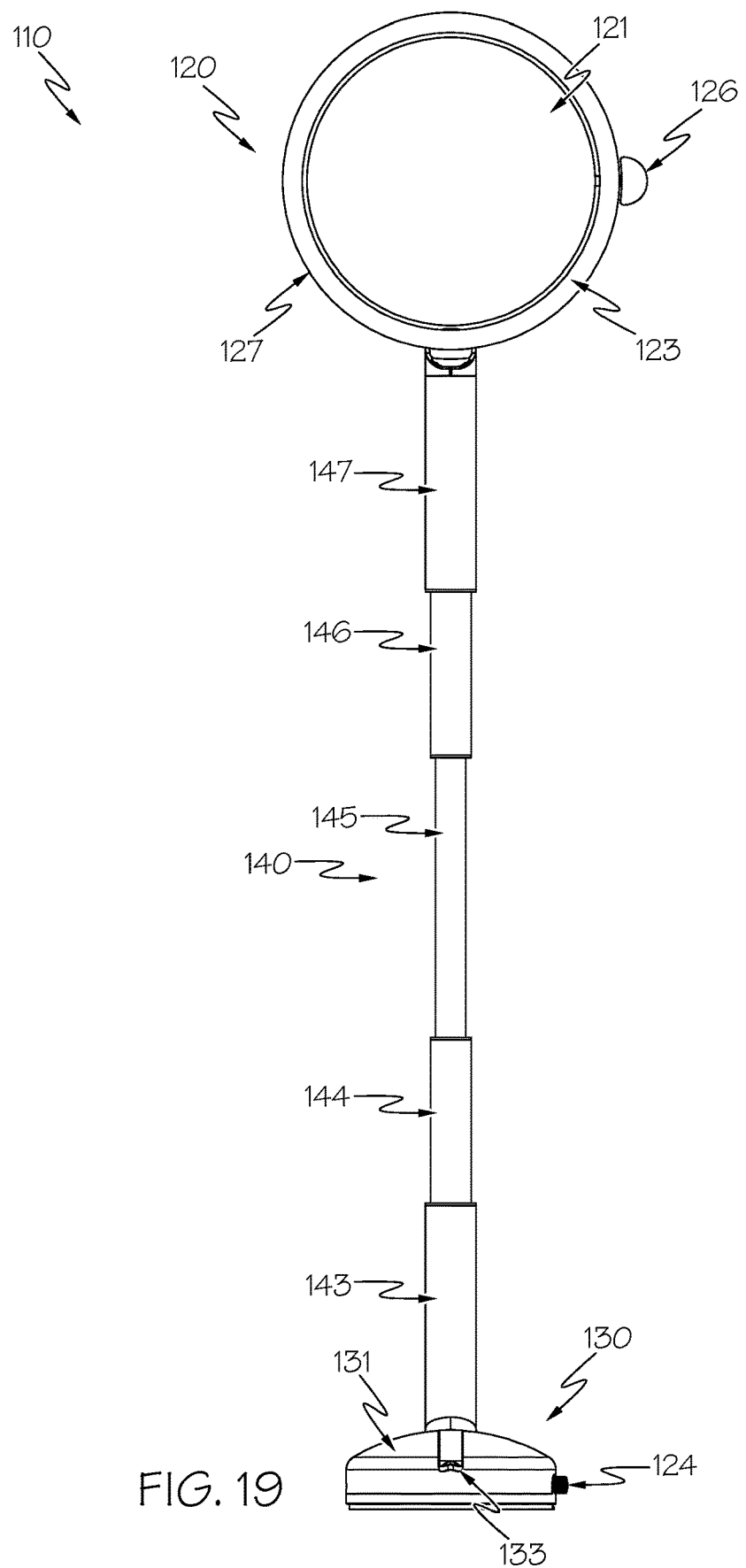
FIG. 19 illustrates a front view of an embodiment of a mirror assembly with the telescoping rod extended and trigger arm engaged.
Figure 20:
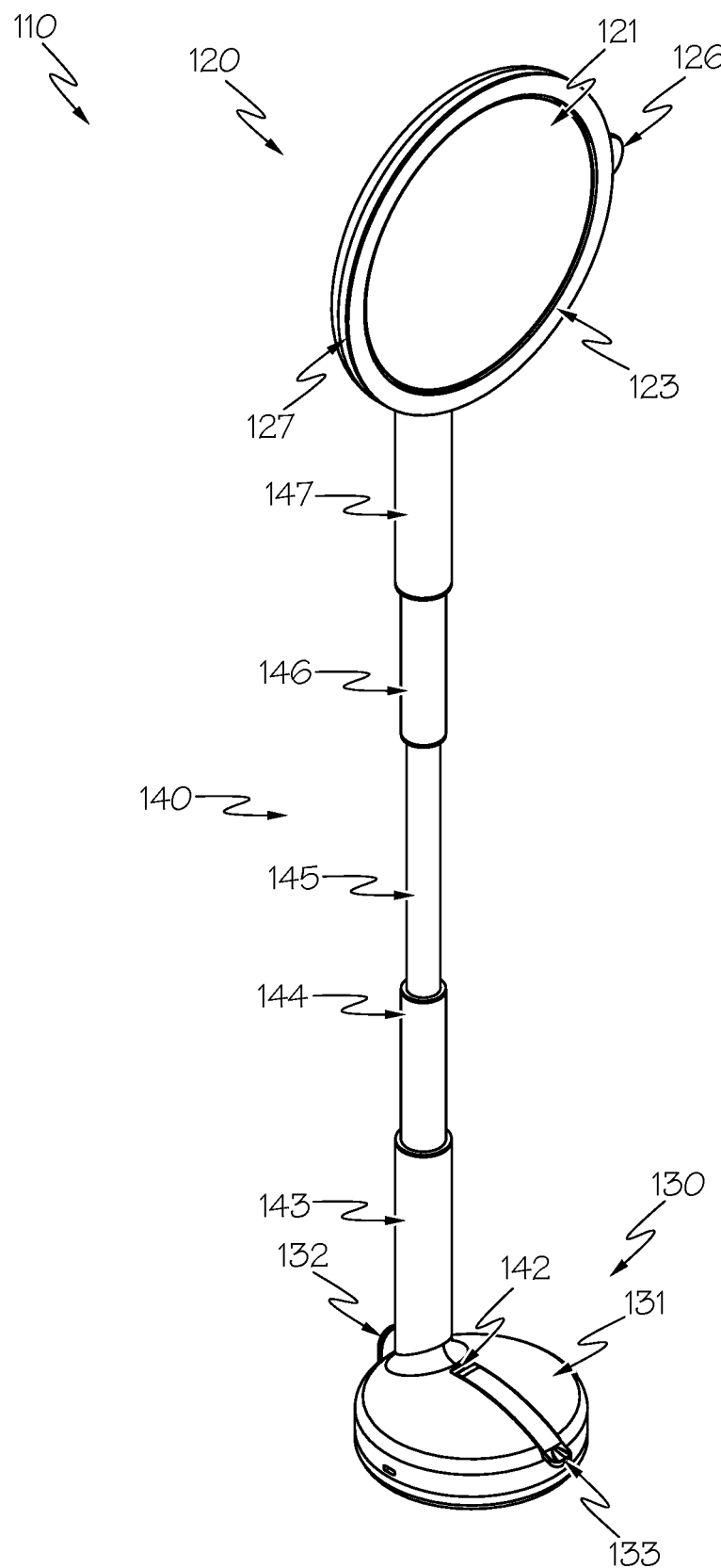
FIG. 20 illustrates a front perspective view of an embodiment of a mirror assembly with the telescoping rod extended, trigger arm engaged, and hanger bracket retracted.
Figure 21:
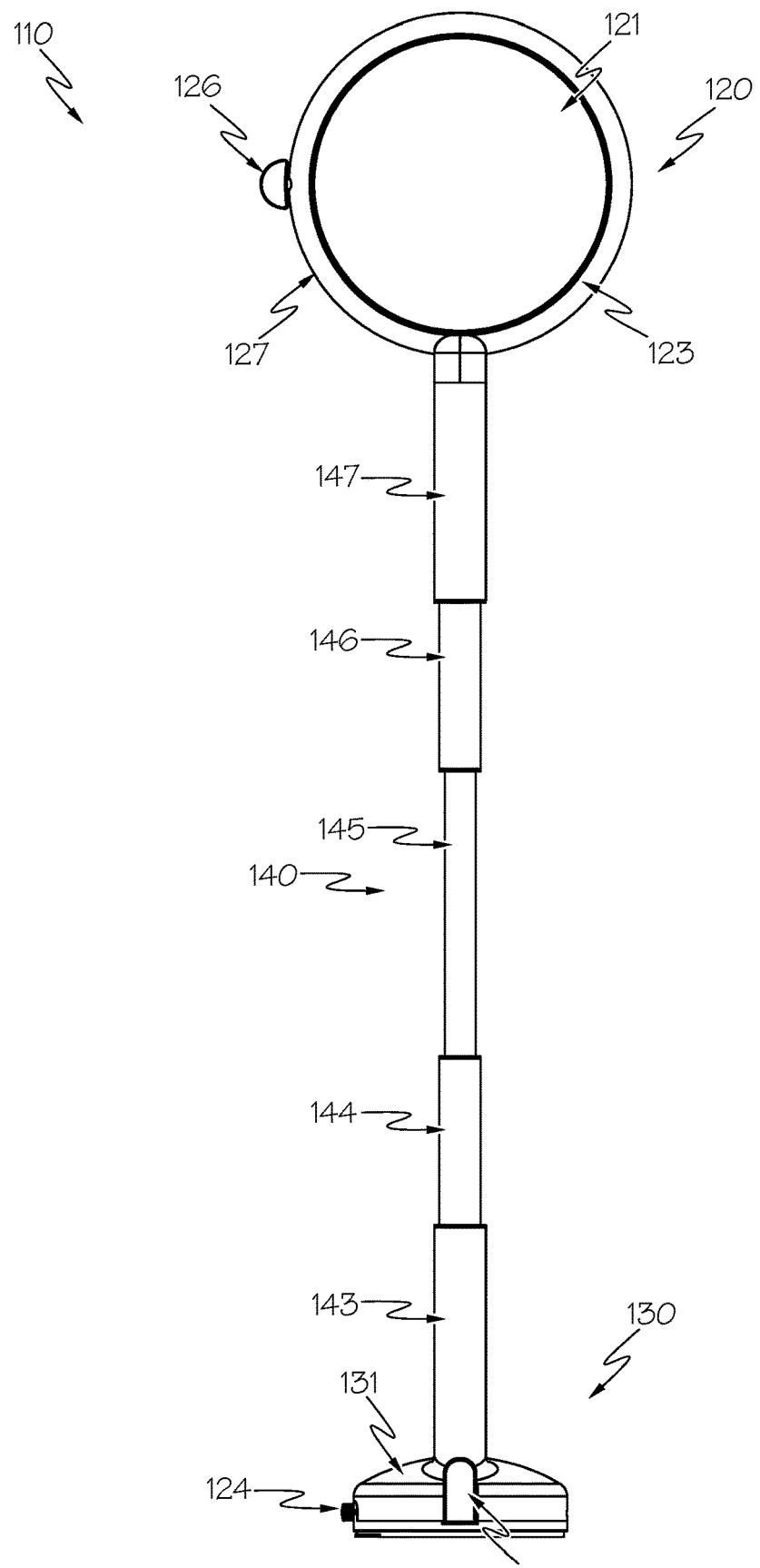
FIG. 21 illustrates a rear view of an embodiment of a mirror assembly with the telescoping rod extended and hanger bracket retracted.
Figure 22:
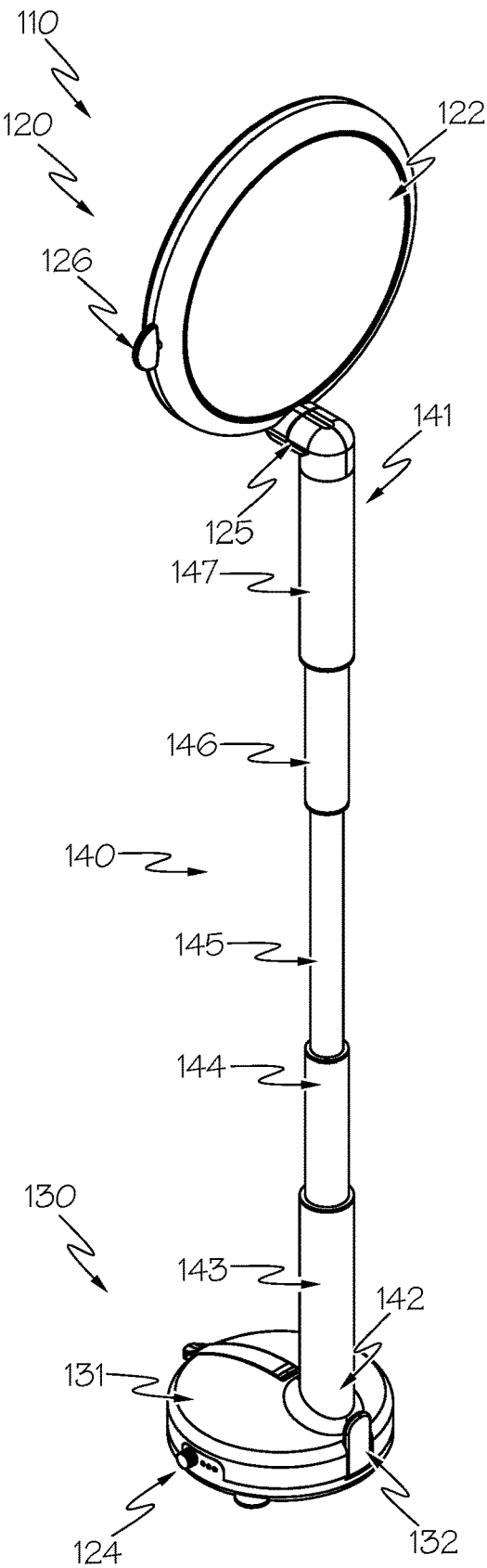
FIG. 22 illustrates a rear perspective view of an embodiment of a mirror assembly with the telescoping rod extended, trigger arm engaged, and hanger bracket retracted.
Figure 23:
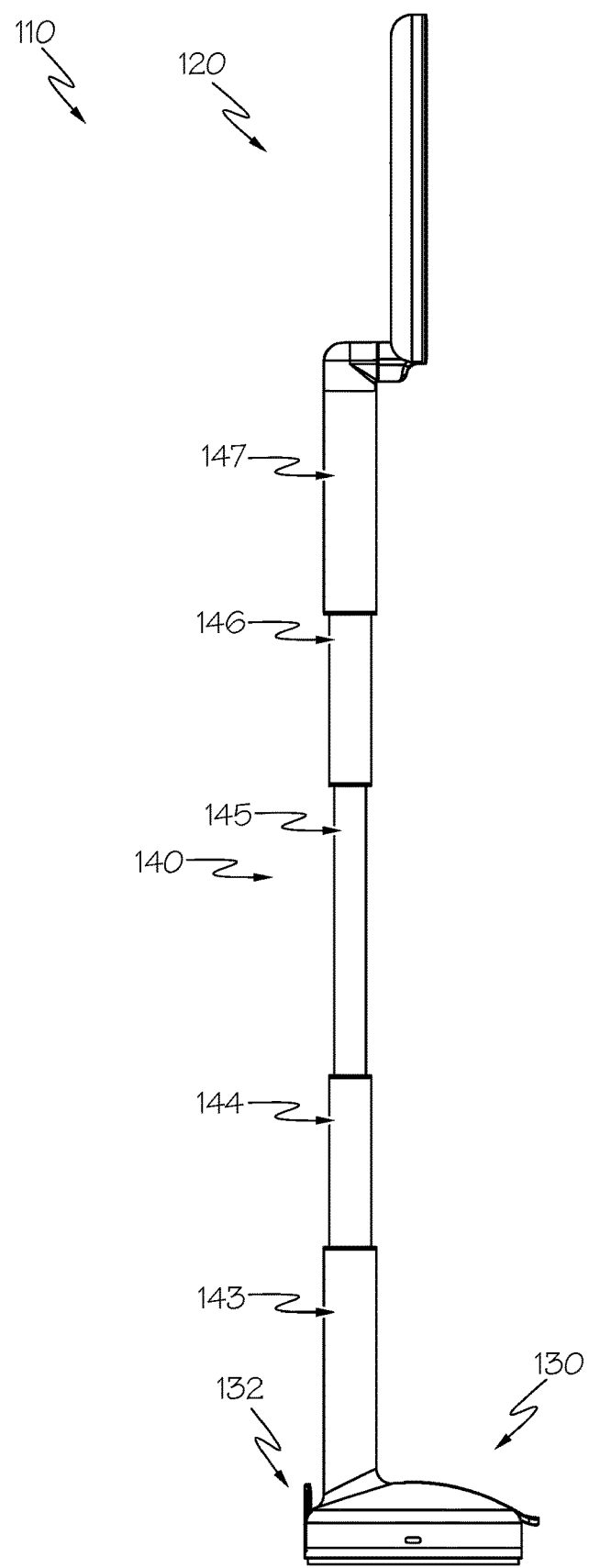
FIG. 23 illustrates a side view of an embodiment of a mirror assembly with the telescoping rod extended, trigger arm engaged, and hanger bracket retracted.
Figure 24:
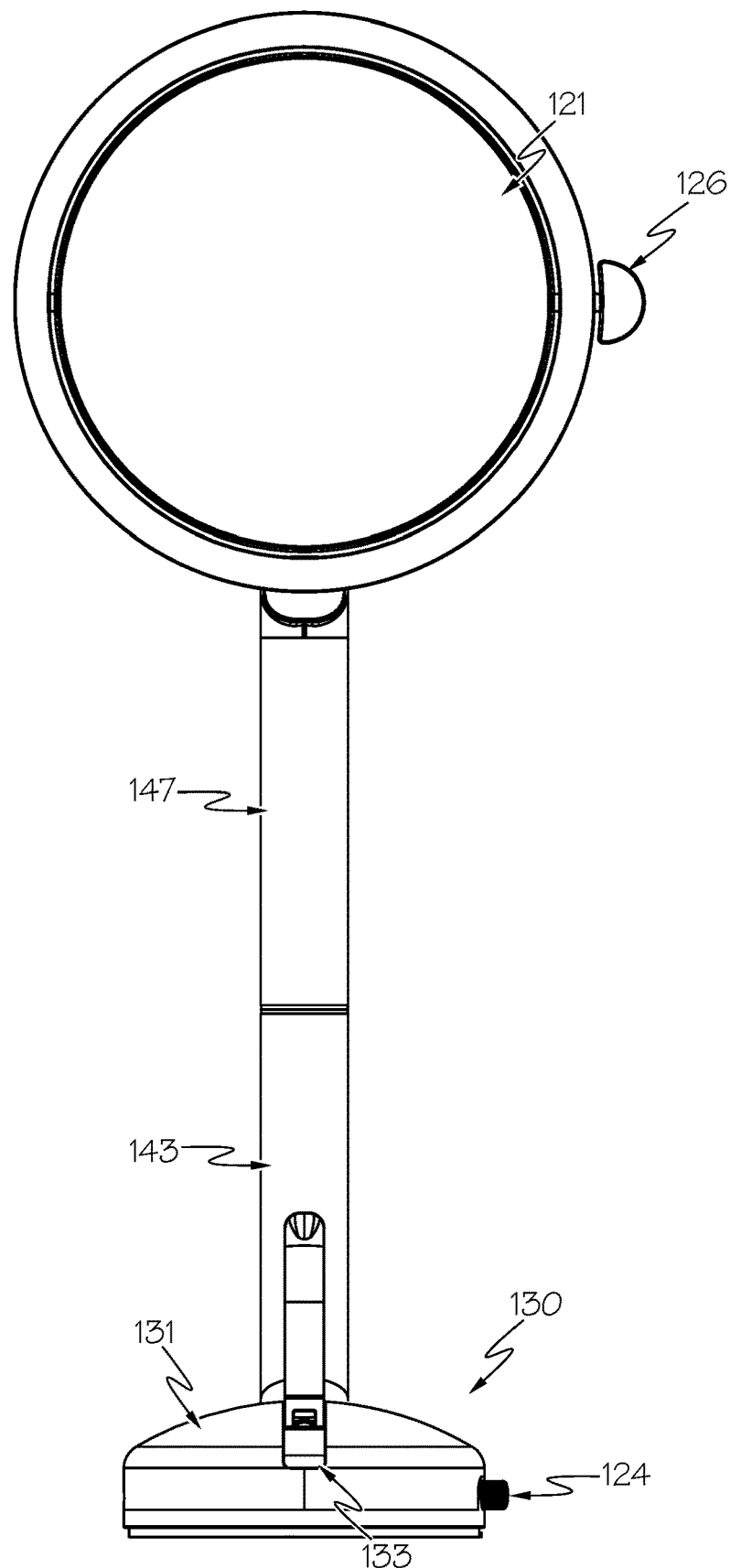
FIG. 24 illustrates a front view of an embodiment of a mirror assembly with the telescoping rod retracted and trigger arm disengaged.
Figure 25:
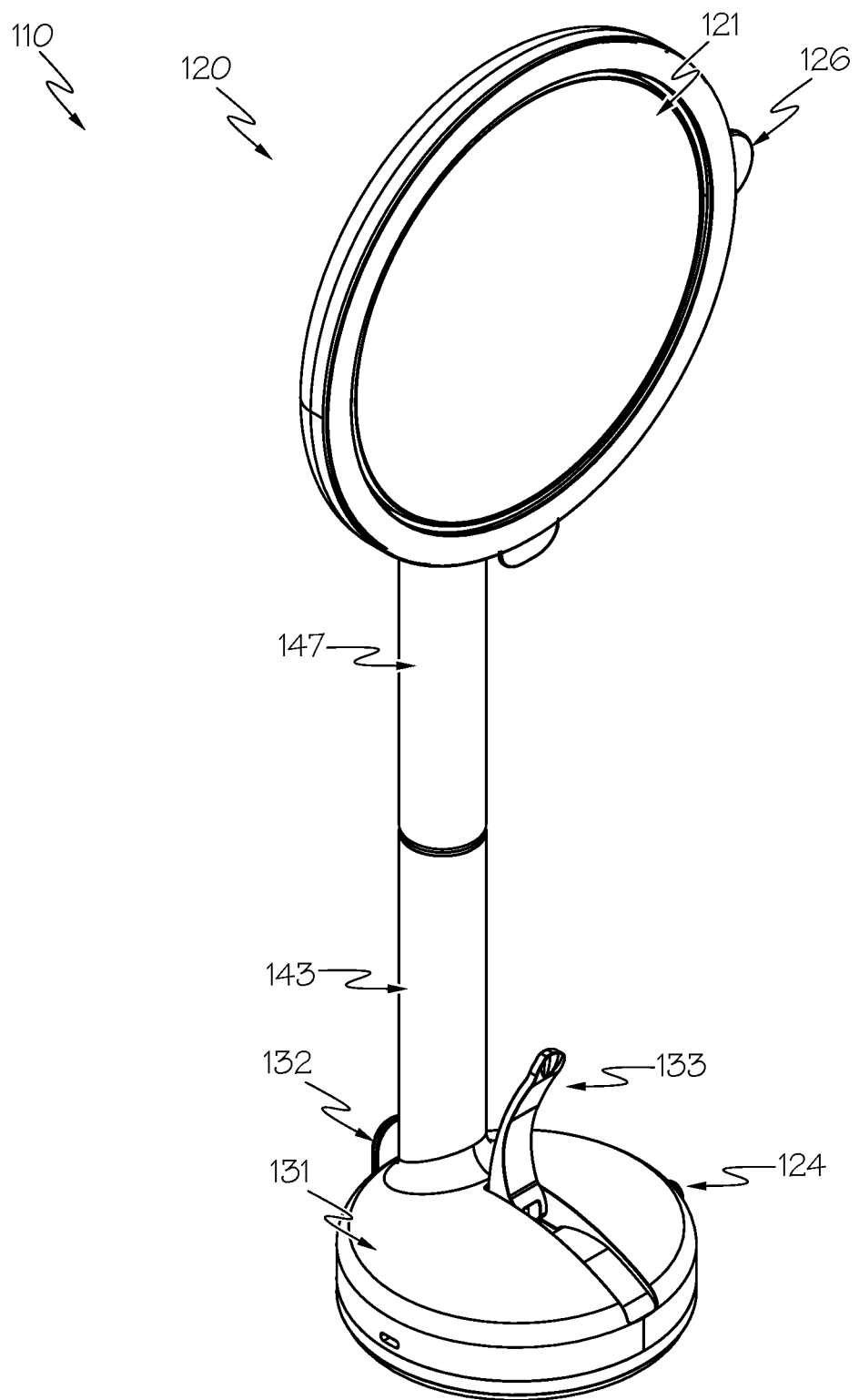
FIG. 25 illustrates a front perspective view of an embodiment of a mirror assembly with the telescoping rod retracted, trigger arm disengaged, and hanger bracket retracted.

FIGS. 19-39 illustrate mirror assembly 110 in accordance with an embodiment of the present invention. As shown in FIGS. 19 and 22, mirror assembly 110 comprises a mirror 120, a suction cup base assembly 130, and a multi-stage telescoping rod 140. Mirror 120 may have a first reflective surface 121 on a first side and a second reflective surface 122 on a second side. Additionally, there may be one or more light sources 123 disposed at a periphery of first reflective surface 121 or second reflective surface 122. The light source or sources 123 may be powered by a battery (e.g., a rechargeable battery or batteries) or may be plugged into an electrical outlet, for example. Rechargeable batteries may be located in suction cup base assembly 130. A battery retainer plate may hold rechargeable batteries in a pyramid configuration to provide room for a sliding tray that holds hanger bracket 132.

Mirror assembly 110 may include a switch 124 for activating or deactivating light source or sources 123, for increasing the intensity of the light emitted by the light source, and for decreasing the intensity of the light emitted by light source 123. As shown in FIG. 19, switch 124 may be located in suction cup base assembly 130. Light source or sources 123 may include a diffuser screen. Housing 127 may be secured to a fourth stage 147 of multi-stage telescoping rod 140 using swivel joint 125. Mirror 120 may also have a lever 126 that when triggered rotates reflective surfaces 121 and 122 relative to light source or sources 123 about an axis normal to the vertical axis of multi-stage telescoping rod 140, for example, thereby allowing a user to view the reflective surface that provides the desired magnification level. Mirror 120 may include a clamp brake that that adds friction to the rotation of the first and second reflective surfaces. A person of ordinary skill in the art would understand that other methods and axes of rotation may be used to rotate reflective surfaces 121 and 122. Each reflective surface 121 and 122 may be non-magnifying or may be magnifying, and each may provide level a of magnification of, for example, 1×, 3×, 5×, 7×, 10×, 15×, or 20×.

Suction cup base assembly 130 may be substantially hemispherical in shape, comprising a round, flexible, concave diaphragm 134 (i.e., a suction cup) on the front side of the planar surface of the hemisphere. The suction cup base assembly 130 can comprise multiple suction cups, but preferably uses only one suction cup 134 in order to reduce the size and weight of the mirror assembly 110, thereby increasing portability. The suction cup 134 may be used to removably mount the mirror assembly 110 to a horizontal or vertical surface. The suction cup 134 may be a locking suction cup or a non-locking suction cup. A housing portion 131 is disposed on the reverse side of the planar surface of the hemisphere. The housing portion 131 is preferably made of a water-, abrasion-, and stain-resistant material, such as plastic. A material such as plastic will resist discoloration and rust that may occur due to conditions in which the mirror assembly may be utilized, e.g., in a damp environment such as a bathroom, adjacent to a water source such as a sink, or near substances that may stain or discolor such as makeup or other grooming products. The plastic material from which the housing portion 131 of the suction cup base assembly 130 is preferably comprised may also be flexible such that it will not crack or break if the mirror assembly 110 is dropped. If the suction cup 134 is a locking suction cup, the housing portion 131 of the suction cup base assembly 130 may also include a trigger arm 133 for engaging the suction cup 134 such that it becomes removably mounted to a horizontal or vertical surface. Additionally, due to the conditions in which the mirror assembly 110 may be utilized, e.g., in a damp environment such as a bathroom, or adjacent to a water source such as a sink, it is preferable for the trigger arm 133 to be comprised of a water- and rust-resistant material such as stainless steel or aluminum. Those of skill in the art, however, would understand that the trigger arm 133 can be comprised of any suitable material.

The suction cup base assembly 130 may also include a hanger bracket 132. The hanger bracket 132 provides support for the mirror assembly 110 to be hung in an inverted manner on a door, a ledge, or the like. To permit the mirror assembly 110 to be hung in an inverted manner from a door, ledge, or the like, the hanger bracket 132 preferably has an internal dimension sufficient to accommodate the minimum and maximum standard thickness of an interior door. The hanger bracket 132 may be shaped as shown, for example, in FIGS. 27, 28, and 30A, or may be shaped in any manner suitable to allow it to support the mirror assembly 110 over a door, ledge, or the like. The hanger bracket 132 is preferably made of metal, such as stainless steel, so that it can adequately support the mirror assembly 110 and is preferably thin enough to permit the door on which the mirror assembly 110 may be hung to be closed. Additionally, due to the conditions in which the mirror assembly 110 may be utilized, e.g., in a damp environment such as a bathroom, or adjacent to a water source such as a sink, it is preferable for the hanger bracket 132 to be comprised of a water- and rust-resistant material such as stainless steel. Those of skill in the art, however, would understand that the hanger bracket 132 can be comprised of any suitable material.

Figure 26:
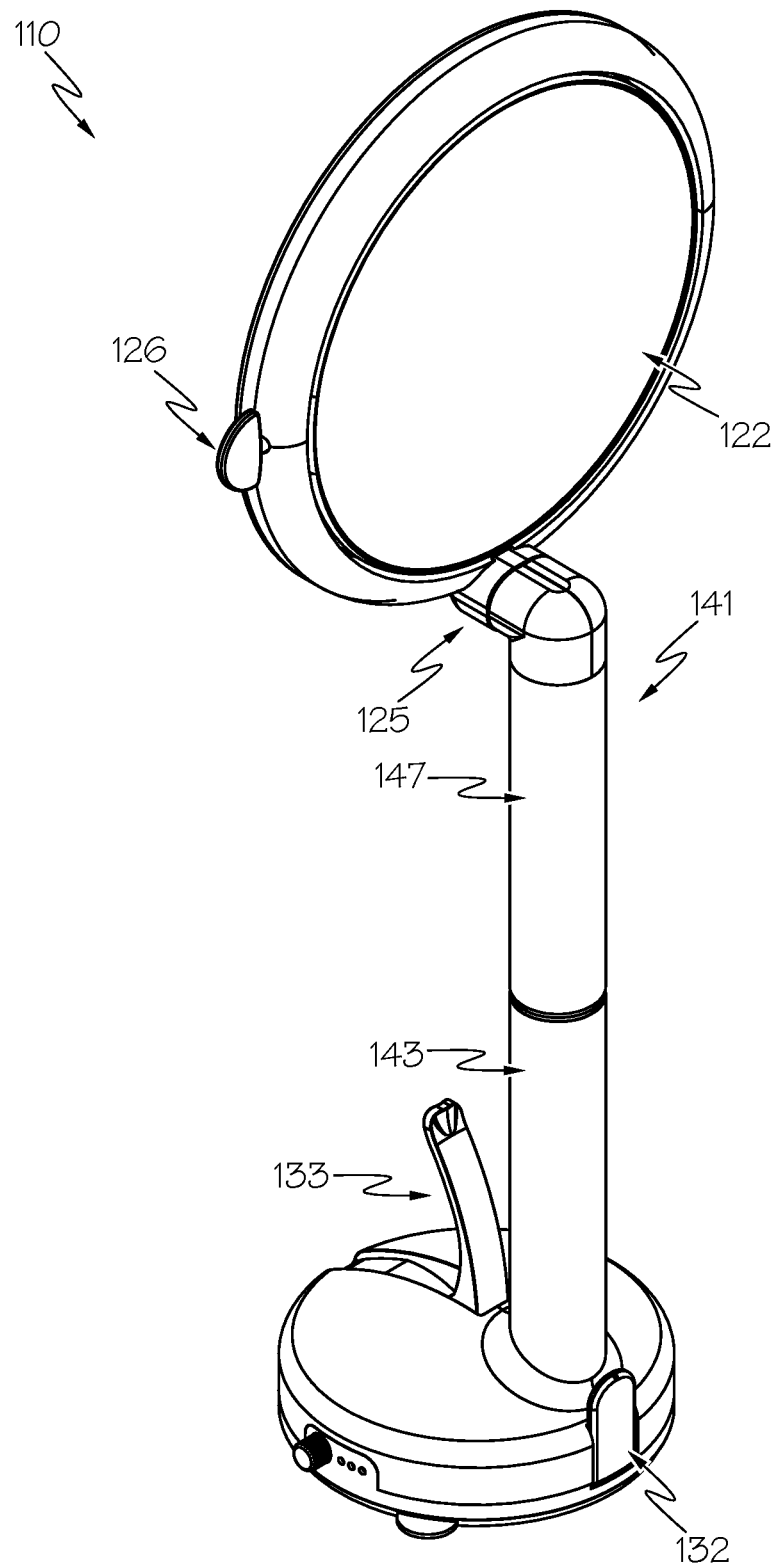
FIG. 26 illustrates a rear perspective view of an embodiment of a mirror assembly with the telescoping rod retracted, trigger arm disengaged, and hanger bracket retracted.
Figure 27:
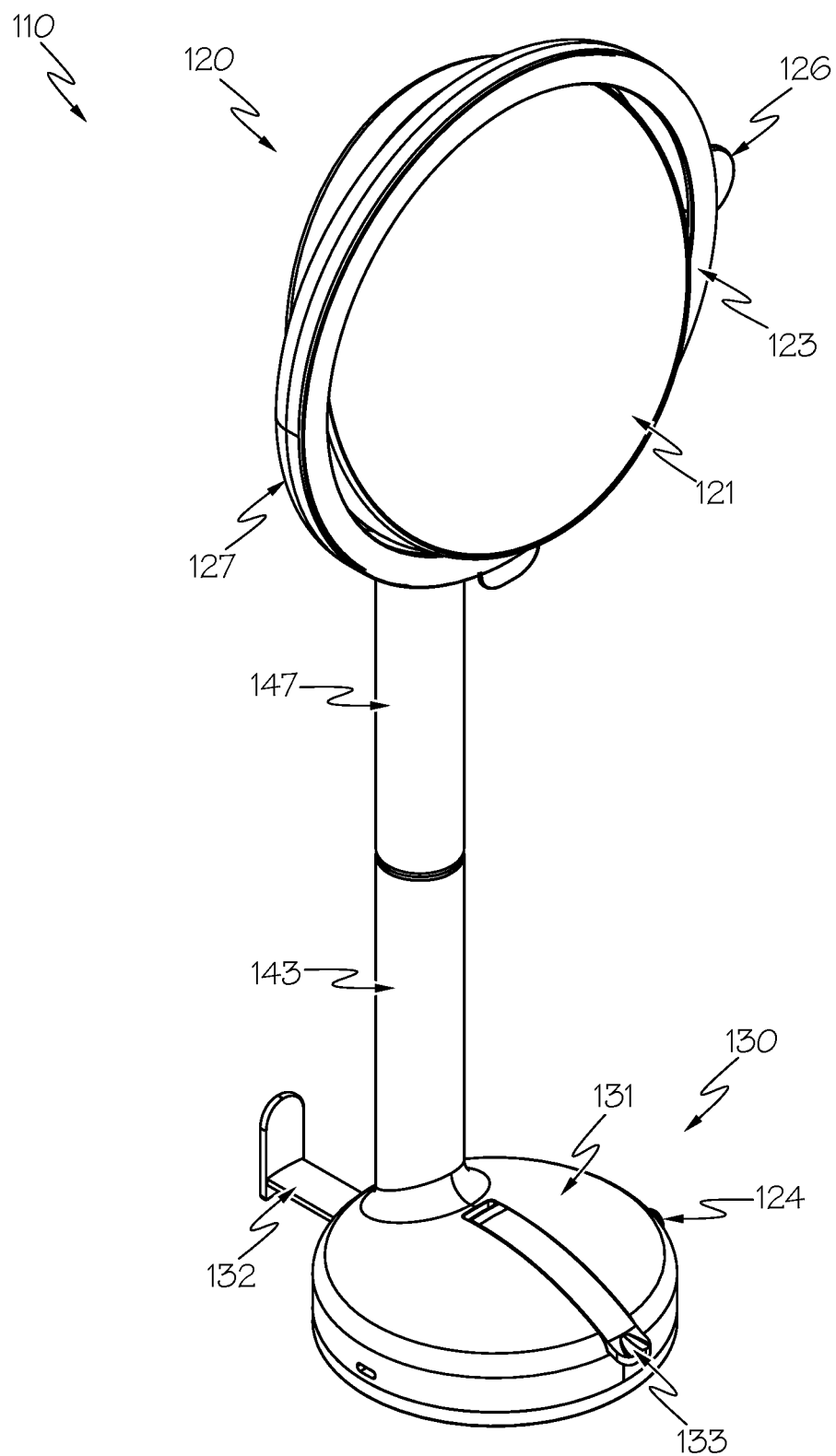
FIG. 27 illustrates a front perspective view of an embodiment of a mirror assembly with the telescoping rod retracted, trigger arm engaged, hanger bracket extended, and reflective surfaces partially rotated.
Figure 28:
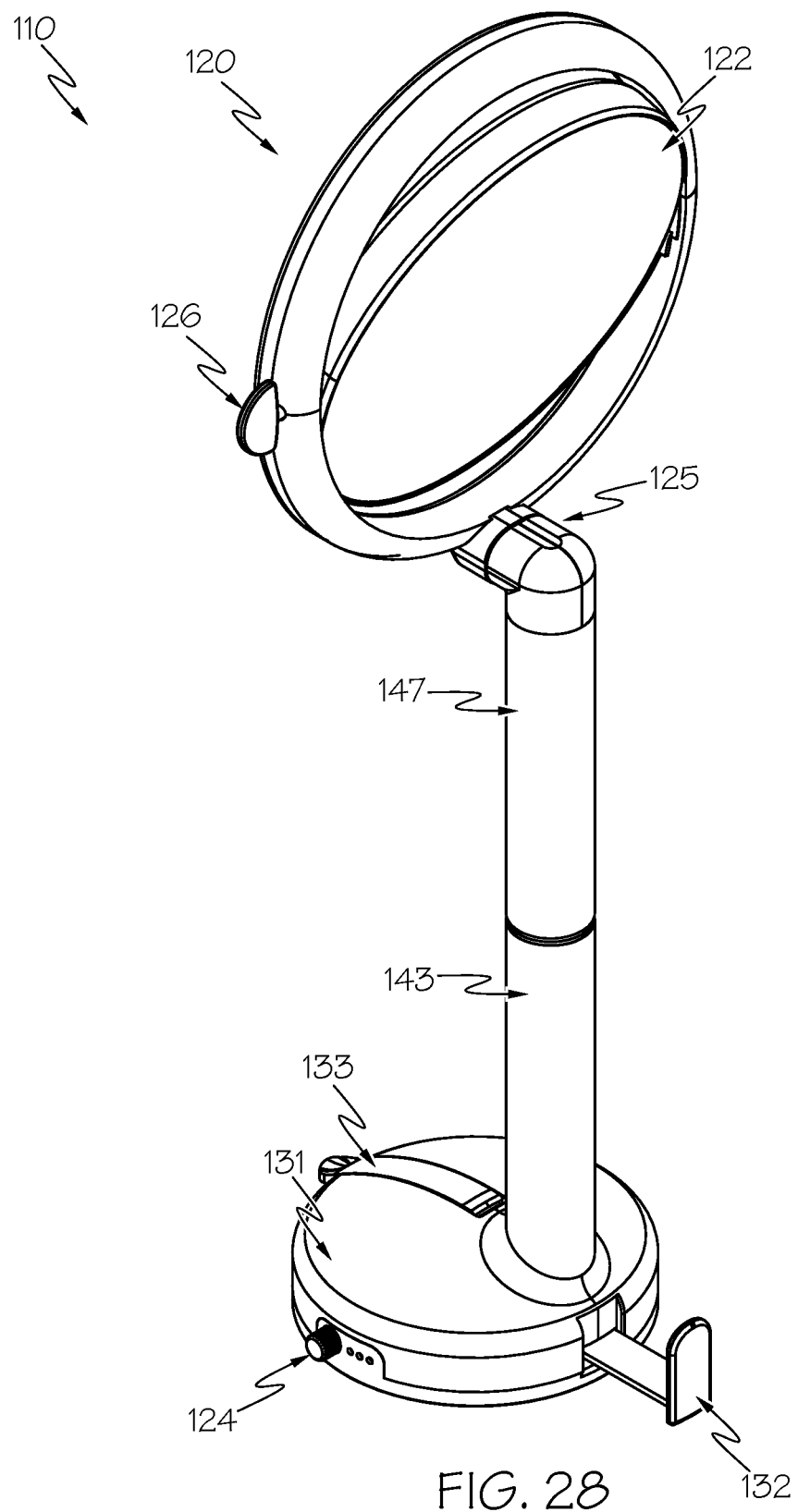
FIG. 28 illustrates a rear perspective view of an embodiment of a mirror assembly with the telescoping rod retracted, trigger arm engaged, hanger bracket extended, and reflective surfaces partially rotated.
Figure 29A:
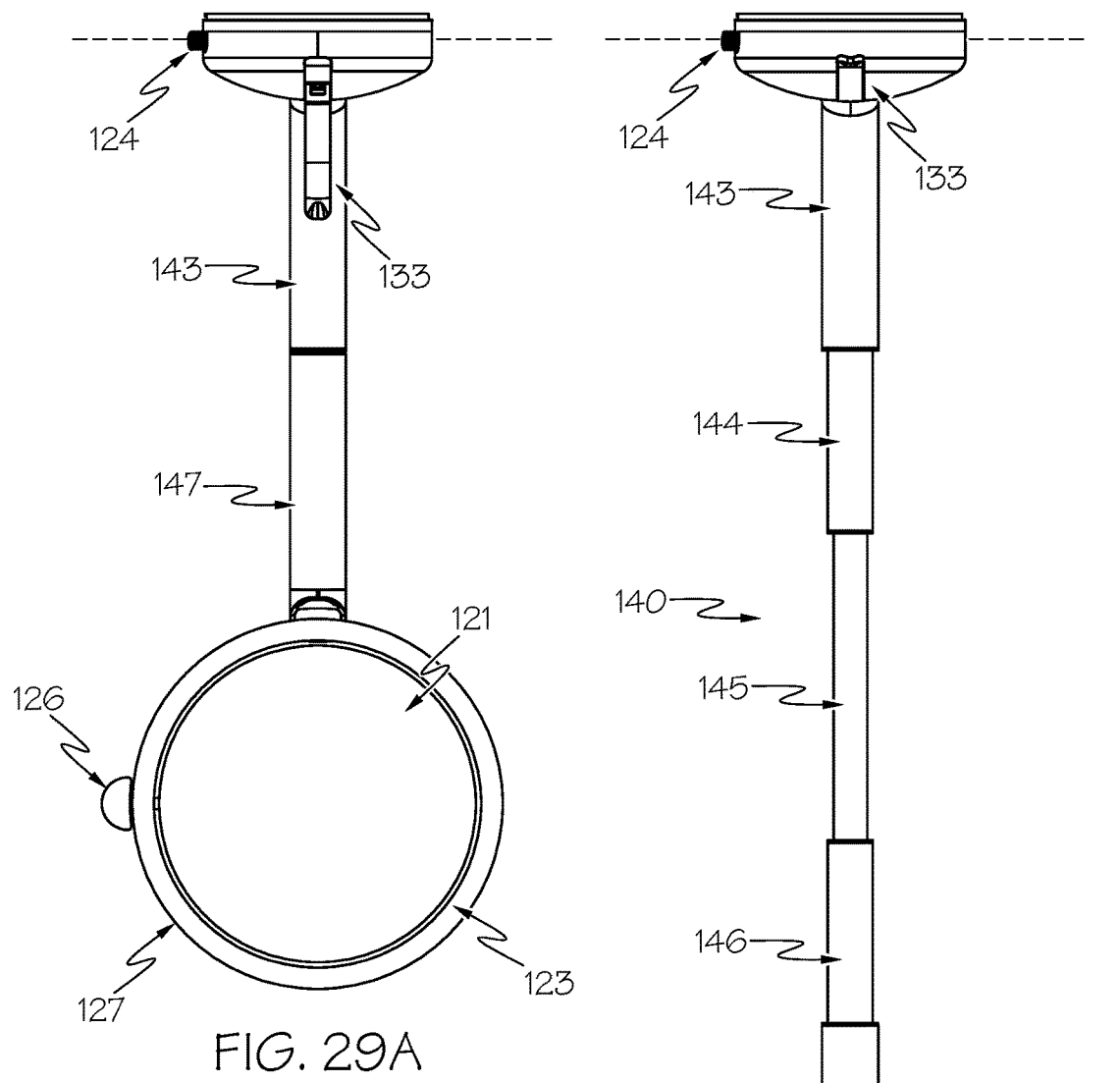
FIG. 29A illustrates a front view of an embodiment of a mirror assembly with the hanger bracket extended and engaged over a door or ledge.
Figure 29B:
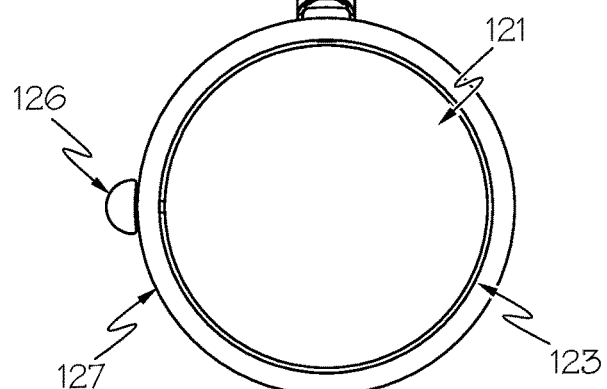
FIG. 29B illustrates a front view of an embodiment of a mirror assembly with the hanger bracket extended and engaged over a door or ledge.
Figure 30A:
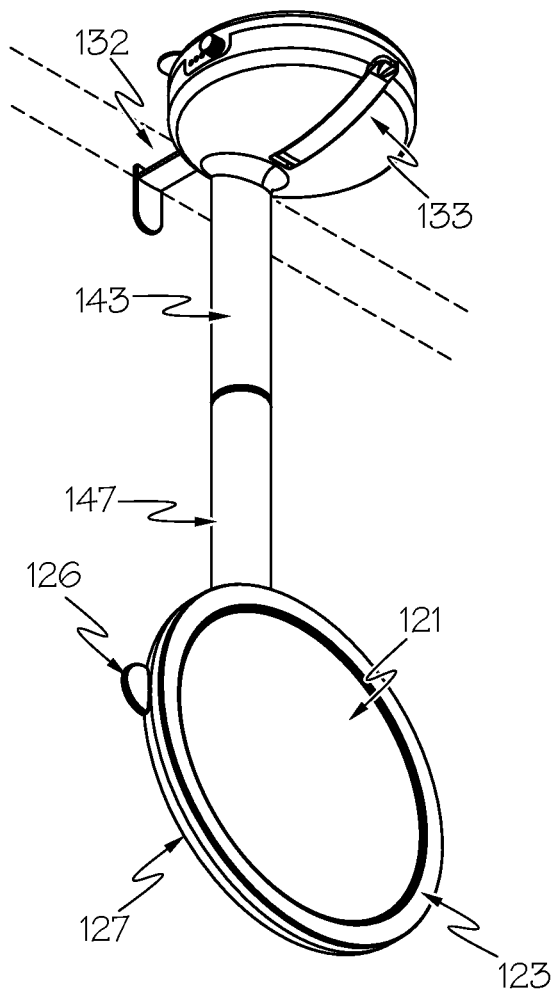
FIG. 30A illustrates a bottom perspective view of an embodiment of a mirror assembly with the hanger bracket extended and engaged over a door or ledge.
Figure 30B:
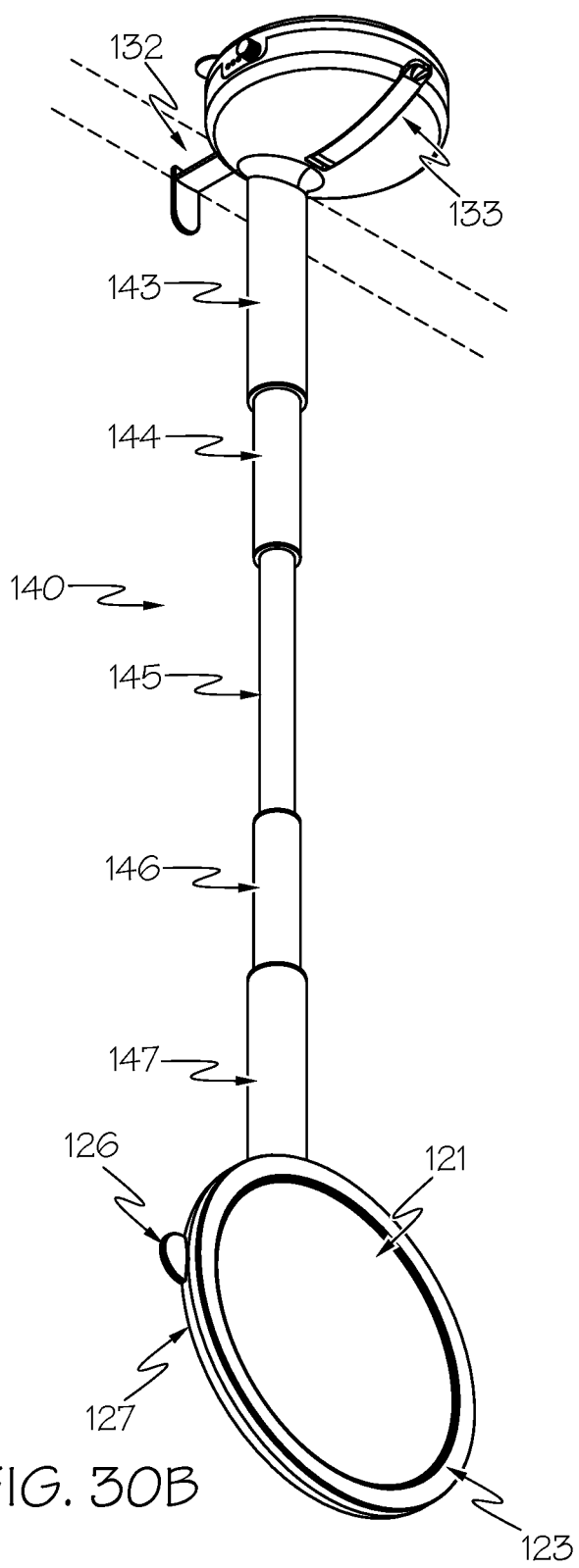
FIG. 30B illustrates a bottom perspective view of an embodiment of a mirror assembly with the hanger bracket extended and engaged over a door or ledge.
Figure 32:
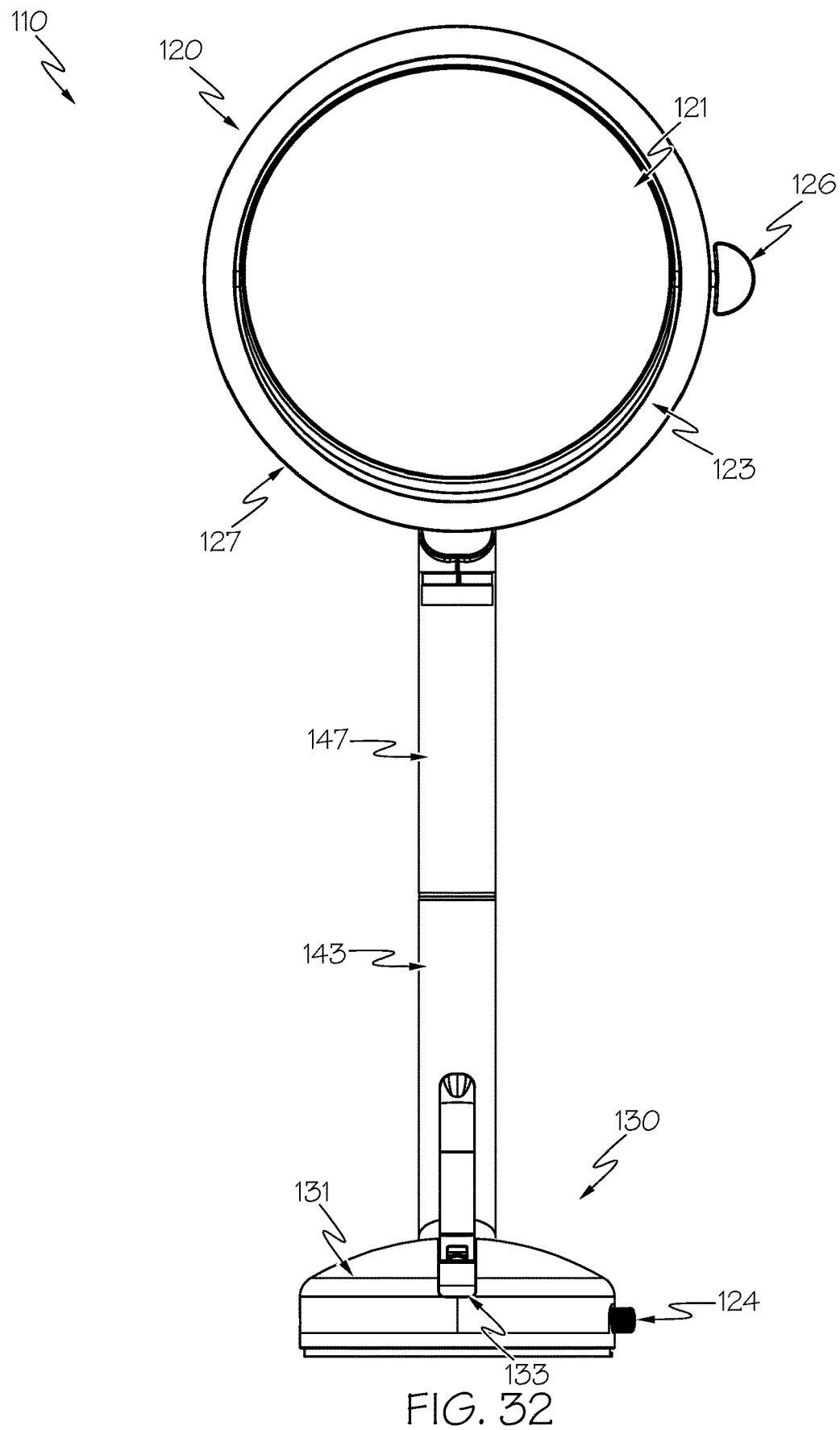
FIG. 32 illustrates a front view of an embodiment of a mirror assembly with the telescoping rod retracted, trigger arm disengaged, and reflective surfaces partially rotated.
Figure 33:
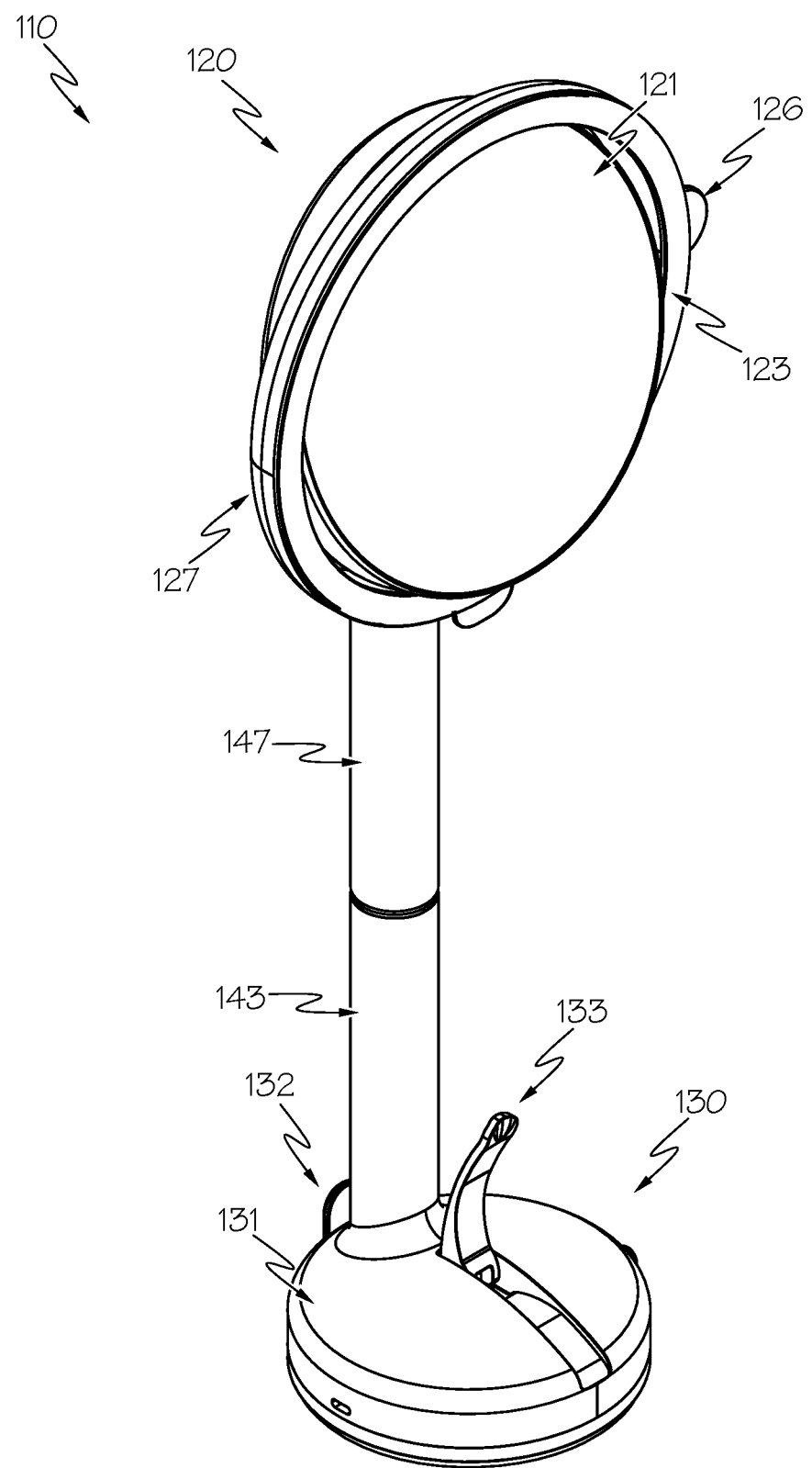
FIG. 33 illustrates a front perspective view of an embodiment of a mirror assembly with the telescoping rod retracted, trigger arm disengaged, hanger bracket retracted, and reflective surfaces partially rotated.
Figure 34:
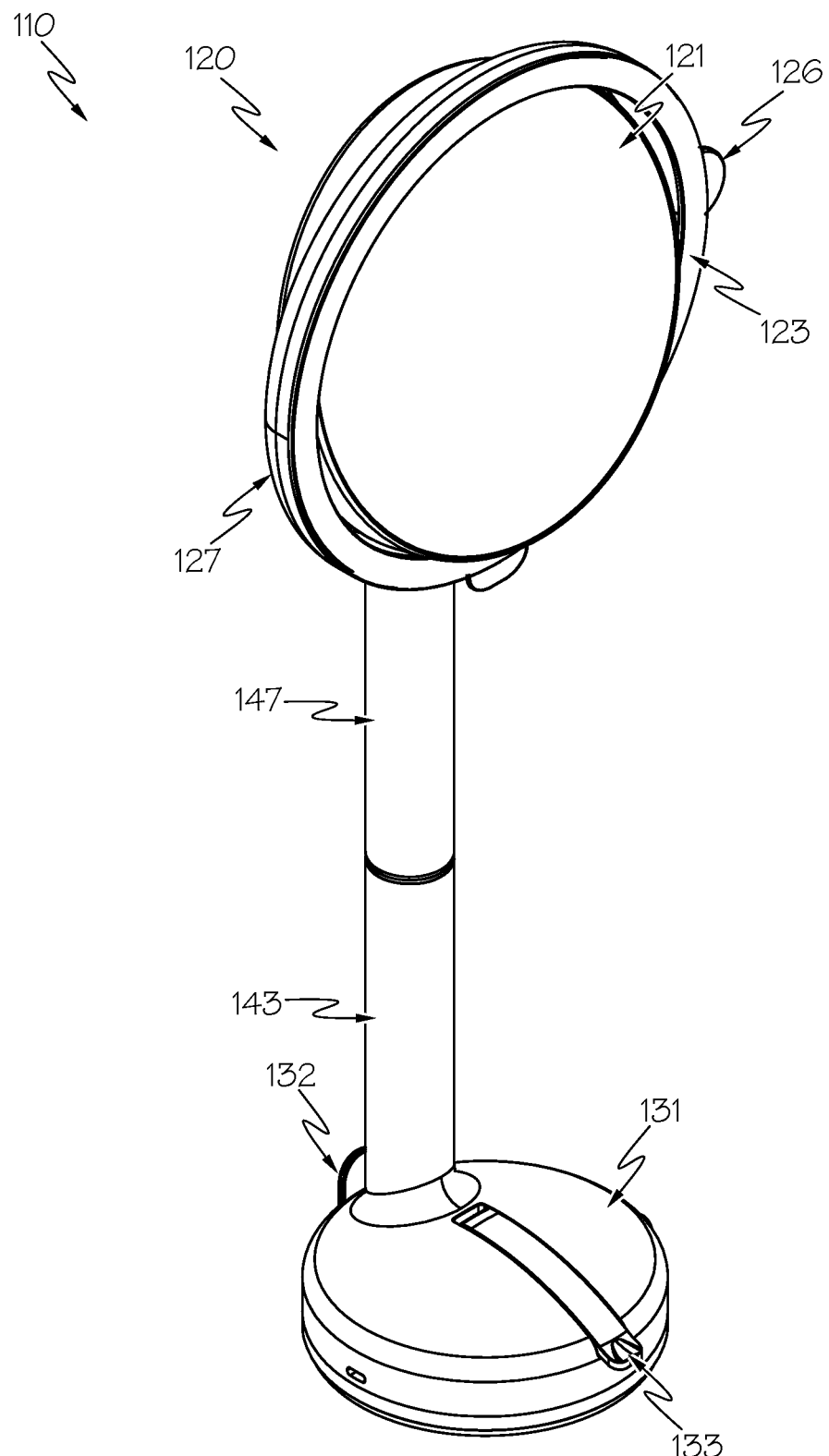
FIG. 34 illustrates a front perspective view of an embodiment of a mirror assembly with the telescoping rod retracted, trigger arm engaged, hanger bracket retracted, and reflective surfaces partially rotated.
Figure 35:
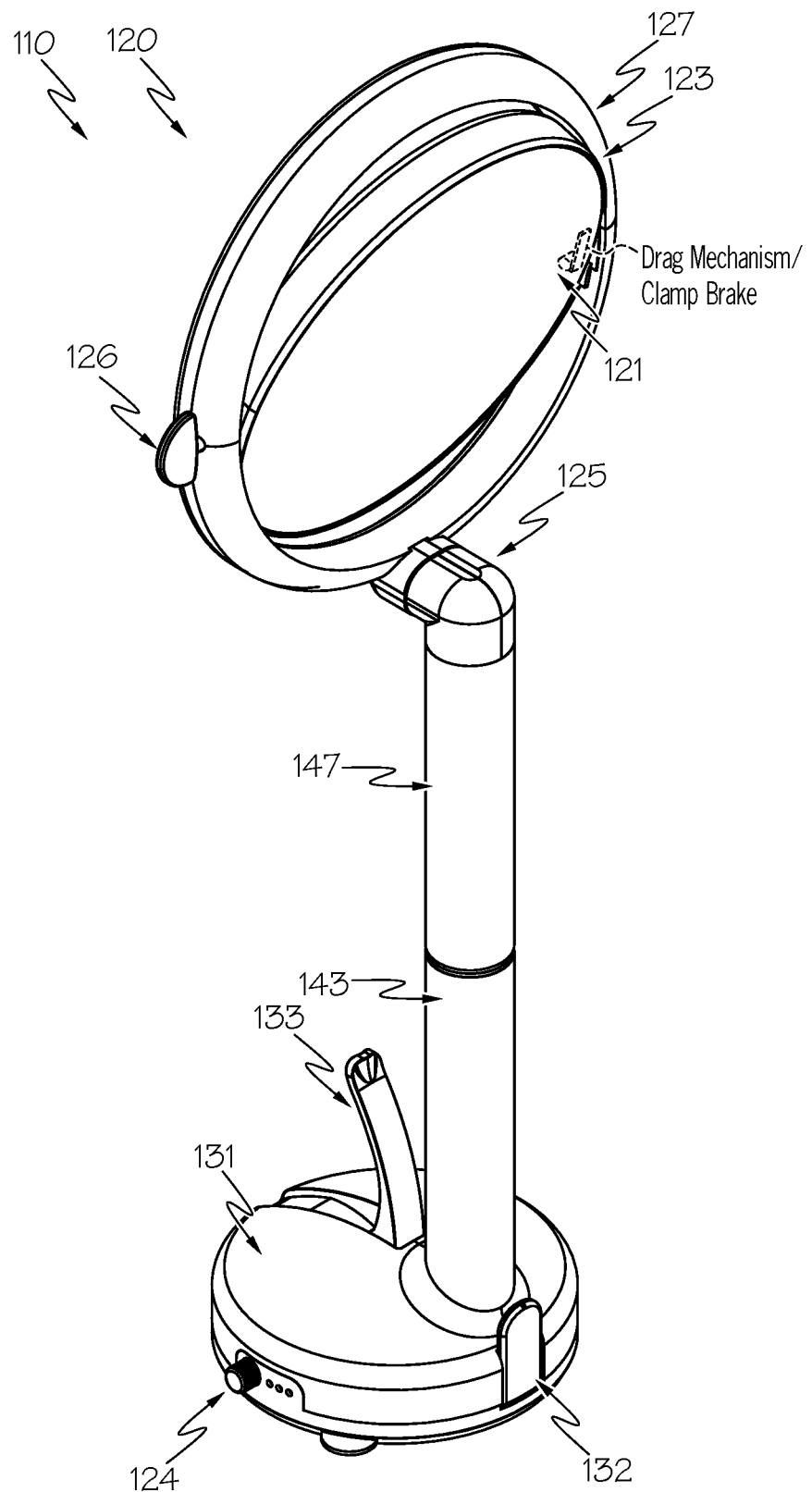
FIG. 35 illustrates a rear perspective view of an embodiment of a mirror assembly with the telescoping rod retracted, trigger arm disengaged, hanger bracket retracted, and reflective surfaces partially rotated.
Figure 36:
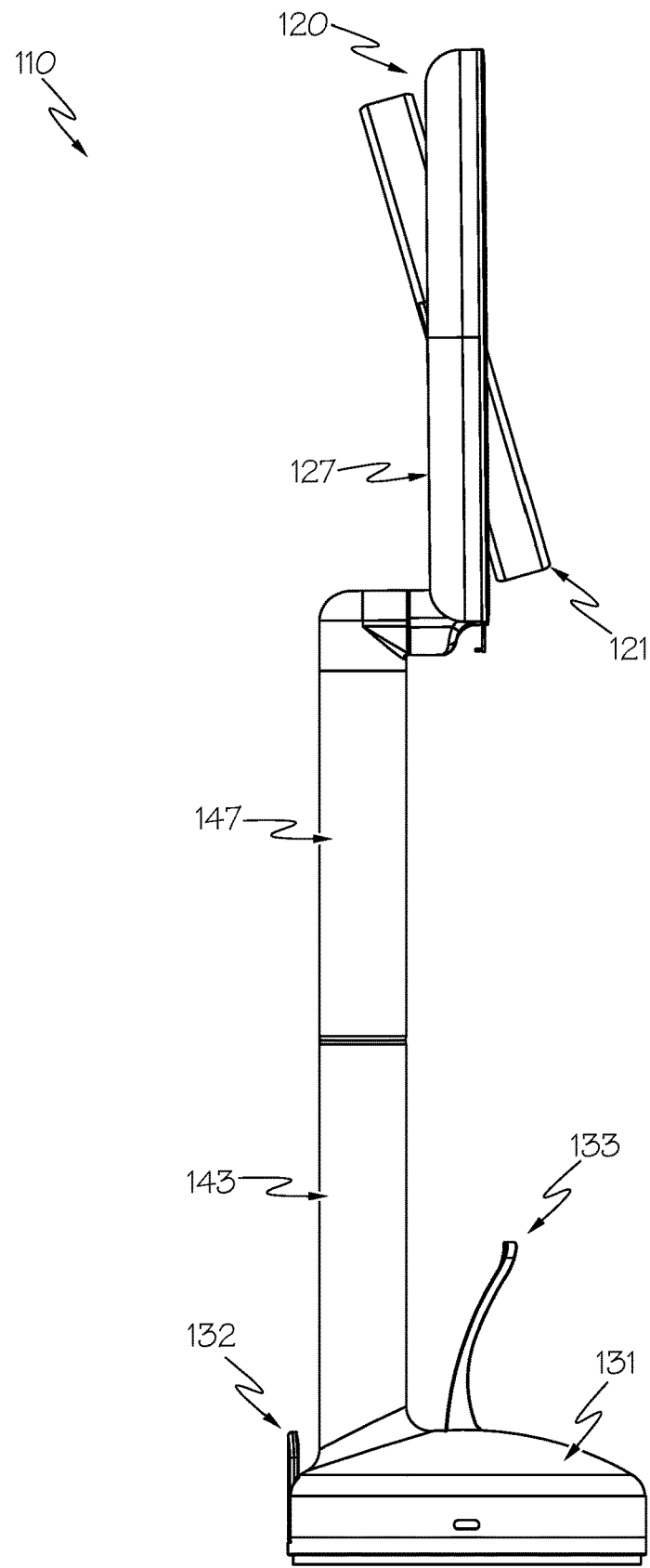
FIG. 36 illustrates a side view of an embodiment of a mirror assembly with the telescoping rod retracted, trigger arm disengaged, hanger bracket retracted, and reflective surfaces partially rotated.
Figure 37:
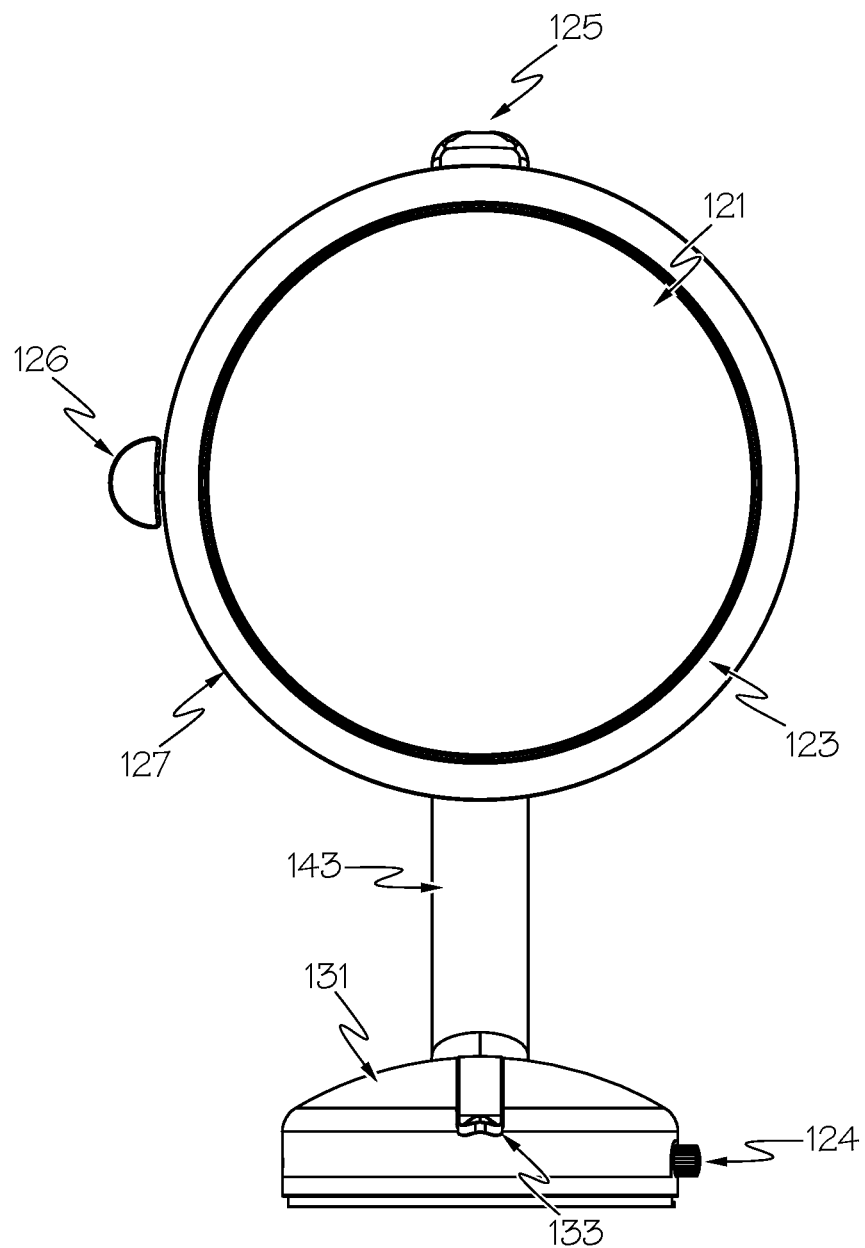
FIG. 37 illustrates a front view of an embodiment of a mirror assembly with the telescoping rod retracted, trigger arm engaged, hanger bracket retracted, and housing rotated.
Figure 38:
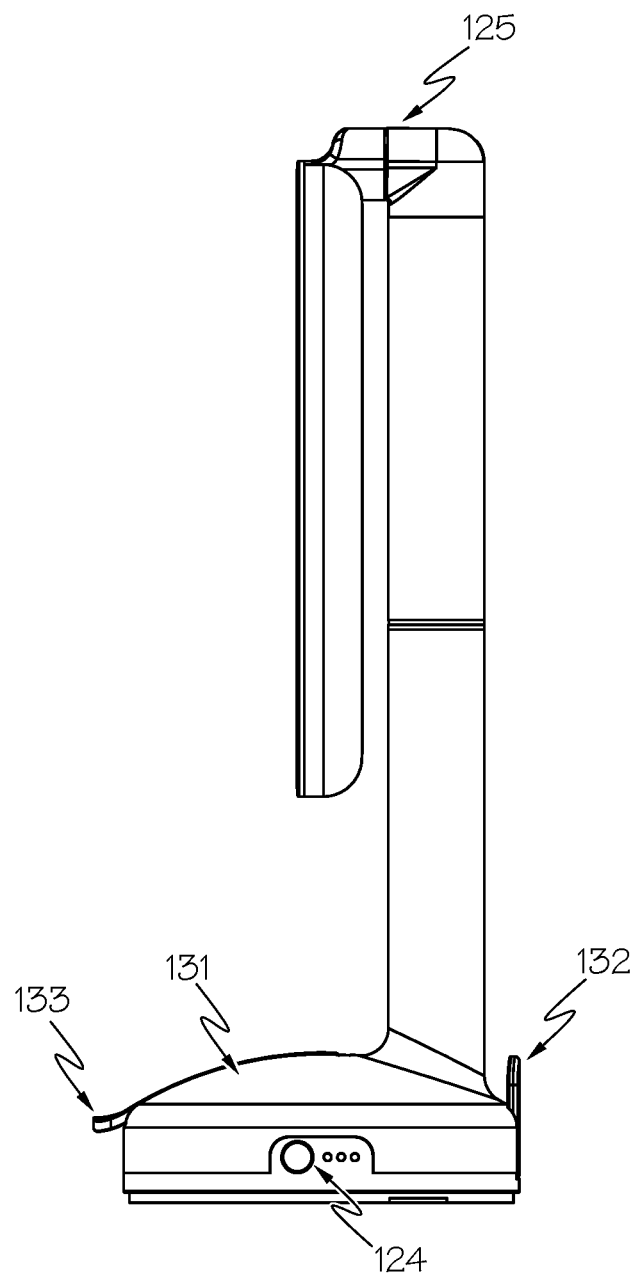
FIG. 38 illustrates a side view of an embodiment of a mirror assembly with the telescoping rod retracted, trigger arm engaged, hanger bracket retracted, and housing rotated.
Figure 39:
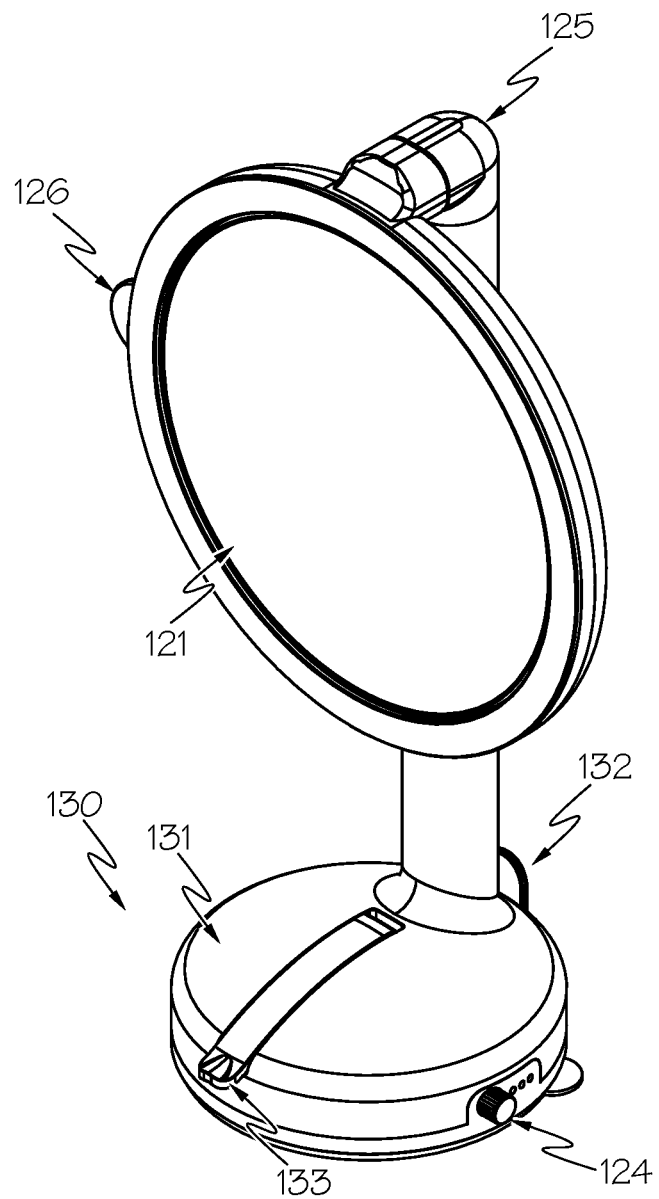
FIG. 39 illustrates a front perspective view of an embodiment of a mirror assembly with the telescoping rod retracted, trigger arm engaged, hanger bracket retracted, and housing rotated.

The hanger bracket 132 is held in place by a sliding tray, thereby allowing hanger bracket 132 to slide in and out of suction cup base assembly 130. The sliding tray permits hanger bracket 132 to extend, as show in FIG. 27, and retract, as shown in FIG. 26, thereby facilitating the compact storage or transport of mirror assembly 110.

A multi-stage telescoping rod 140 extends between suction cup base assembly 130 and mirror 120. In some embodiments, first end 141 of multi-stage telescoping rod 140 is secured to housing 127 of mirror 120 using swivel joint 125. Swivel joint 125 allows the user of mirror assembly 110 to adjust mirror 120 to obtain the desired position. Second end 142 of multi-stage telescoping rod 140 is attached to housing portion 131 of suction cup base assembly 130. Telescoping rod 140 may be retracted or extended in order to adjust the height of mirror 120 or distance from the user or to facilitate the compact storage or transport of mirror assembly 110. Multi-stage telescoping rod 140 may have a base stage 143 and four additional stages, wherein base stage 143 has a certain diameter, stage one 144 and stage two 145 have progressively decreasing diameters, and stage three 146 and stage four 147 have progressively increasing diameters such that the diameter of stage four 147 may be equal to the diameter of base stage 143.

Additionally, a smooth disc of, for example, 5" in diameter, may be provided to enhance the stability of the mirror assembly 110 when the telescoping rod 140 is fully extended by removably mounting the suction cup base assembly 130 to the disc using the suction cup 134, thereby providing a larger footprint and increased stability to the mirror assembly 110.

In another embodiment, a mirror assembly comprises a mirror, a suction cup base assembly, and a telescoping rod. The mirror may be substantially hemispherical in shape, comprising a flat, circular reflective surface disposed on the front side of the planar surface of the hemisphere, and a housing disposed on the reverse side of the planar surface of the hemisphere. The housing may have a socket for use in a ball joint by which a first end of a telescoping rod may be secured to the housing or the housing may be secured to the first end of a telescoping rod using a swivel joint. Additionally, there may be one or more light sources disposed at the periphery of the reflective surface. The light source or sources may be powered by a battery (e.g., a rechargeable battery) or may be plugged into an electrical outlet, for example. The light source or sources may be activated and deactivated by a switch, or the like, which may be located adjacent the light source on the front side of the planar surface of the hemisphere or on the reverse side, or may be located in the suction cup base, for example. The reflective surface may be non-magnifying or may be magnifying, providing magnification at a level of, for example, 1×, 3×, 5×, 7×, 10×, 15×, or 20×. It will be understood by persons skilled in the art that modifications may be made to the embodiments described herein while remaining within the scope of the claimed invention.

What is claimed is:

1. A mirror assembly comprising:
    a mirror;
    a suction cup base assembly;
        the suction cup base assembly comprising a suction cup base assembly housing, a hanger bracket, and at least one suction cup;
        wherein the hanger bracket is configured to hook over an object to secure the suction cup base assembly to the object and
        wherein the hanger bracket can slide in and out of the suction cup base assembly;
    a telescoping rod extending between the mirror and the suction cup base assembly;
    wherein a first end of the telescoping rod is secured to the mirror using a joint and a second end of the telescoping rod is secured to the suction cup base assembly housing.

2. The mirror assembly of claim 1, wherein one or more light sources is disposed at a periphery of the mirror.

3. The mirror assembly of claim 2, wherein the one or more light sources includes a diffuser screen.

4. The mirror assembly of claim 1, wherein at least one of the at least one suction cup is a locking suction cup.

5. The mirror assembly of claim 1, further comprising a trigger arm for engaging at least one of the at least one suction cup.

6. The mirror assembly of claim 1, wherein the mirror comprises a mirror housing, wherein the mirror housing comprises a first reflective surface disposed on a first side of the mirror housing and a second reflective surface disposed on a second side of the mirror housing, and wherein at least one of the first reflective surface and the second reflective surface is magnifying.

7. The mirror assembly of claim 6, wherein the first reflective surface and the second reflective surface are rotatably mounted relative to the one or more light sources disposed at a periphery of the mirror.

8. The mirror assembly of claim 7, wherein the mirror assembly includes at least one drag mechanism.

9. The mirror assembly of claim 7, wherein the mirror assembly includes at least one clamp brake.

10. The mirror assembly of claim 1, wherein the joint is a swivel joint.

11. The mirror assembly of claim 1, wherein the joint is a ball joint.

12. The mirror assembly of claim 11, wherein the ball joint includes a socket and wherein the socket includes at least one concave portion at a periphery of the socket that prevents the mirror from being able to rotate in a plane.

13. The mirror assembly of claim 1, wherein the joint includes a socket and wherein the socket includes at least one concave portion at a periphery of the socket that prevents the mirror from being able to rotate in a plane.

14. The mirror assembly of claim 1, wherein the telescoping rod includes at least three rod sections including a first rod section at the first end, a second rod section at the second end, and an intermediate rod section located between the first rod section and the second rod section, wherein each of the three rod sections has a length and a width that is smaller than the length, and wherein the width of the second section is greater than the width of the intermediate section, and the width of the intermediate section is greater than the width of the first section.

15. The mirror assembly of claim 1, wherein the telescoping rod includes at least three rod sections including a first rod section at the first end, a second rod section at the second end, and an intermediate rod section located between the first rod section and the second rod section, wherein each of the three rod sections has a length and a width that is smaller than the length, and wherein the width of the second section is greater than the width of the intermediate section, and the width of the intermediate section is less than the width of the first section.

* * * * *